US007374482B2

(12) United States Patent
Ghaly

(10) Patent No.: US 7,374,482 B2
(45) Date of Patent: May 20, 2008

(54) INTERACTIVE SLOT MACHINE

(76) Inventor: Nabil N. Ghaly, 14 Longwood Dr., South Huntington, NY (US) 11746

(*) Notice: Subject to any disclaimer, the term of this patent is extended or adjusted under 35 U.S.C. 154(b) by 799 days.

(21) Appl. No.: 10/917,129

(22) Filed: Aug. 13, 2003

(65) Prior Publication Data

US 2005/0164764 A1 Jul. 28, 2005

Related U.S. Application Data

(60) Provisional application No. 60/494,355, filed on Aug. 12, 2003.

(51) Int. Cl.
*A63F 13/10* (2006.01)

(52) U.S. Cl. .......................................... 463/16; 463/20

(58) Field of Classification Search .................. 463/20, 463/22, 9
See application file for complete search history.

(56) References Cited

U.S. PATENT DOCUMENTS 3,825,255 A * 7/1974 Kennard et al. ............ 273/139
4,837,728 A * 6/1989 Barrie et al. .................. 463/27
5,286,037 A * 2/1994 Ghaly ........................... 463/9
6,033,307 A * 3/2000 Vancura ........................ 463/20
2002/0107066 A1* 8/2002 Seelig et al. .................. 463/20
2004/0198494 A1* 10/2004 Nguyen et al. ............... 463/42

* cited by examiner

*Primary Examiner*—Xuan M. Thai
*Assistant Examiner*—Masud Ahmed

(57) ABSTRACT

An interactive gaming device, method and apparatus, is disclosed which includes means to assign binary numbers to playing positions. Each of said playing positions includes an indicator and a logical element to select and route pairs of the binary numbers to each other. Each playing position may also include an input control mechanism to enable a player to manually interact with the gaming device. Upon a random or a manual activation of a logical element, the matched pairs of binary numbers are used to generate a plurality of display codes. The device then assigns these display codes to the playing positions in order to produce colors or images at the indicators. A determination is then made if a winning display combination has occurred. A plurality of sound and visual effects are also provided to heighten the enjoyment of using the device.

38 Claims, 28 Drawing Sheets

ROUTING SQUARE

Continued on Figure – 5 -

| WINNING COMBINATION | COLORS | COINS |
|---|---|---|
| ANY 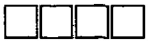 |  | 5 |
| ANY 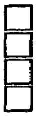 |  | 5 |
| 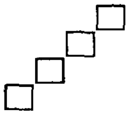 |  | 10 |
| 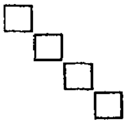 |  | 10 |
| ANY  | 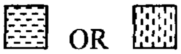 | 10 |
| ANY 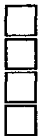 |  | 10 |
| 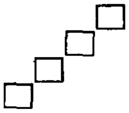 | 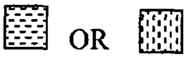 | 20 |
| 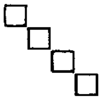 | 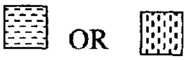 | 20 |
| 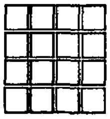 |  | 80 |
| 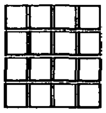 | 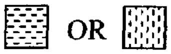 | 200 |
Figure – 15 -

3 X 3 - SIX COLOR OPERATION – 3 BITS

3 X 3 - THREE COLOR OPERATION – 2 BITS

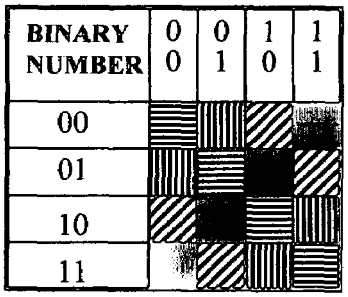
| BINARY NUMBER | 00 | 01 | 10 | 11 |
|---|---|---|---|---|
| 00 | 00 | 01 | 10 | 11 |
| 01 | 01 | 00 | 11 | 10 |
| 10 | 10 | 11 | 00 | 01 |
| 11 | 11 | 10 | 01 | 00 |
EXCLUSIVE OR (XOR)
BOOLEAN FUNCTION
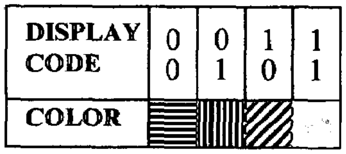
4 X 4 - FOUR COLOR OPERATION – 2 BITS
Figure – 22 -

5 X 5 - SIX COLOR OPERATION – 5 BITS

6 X 6 - SEVEN COLOR OPERATION – 4 BITS

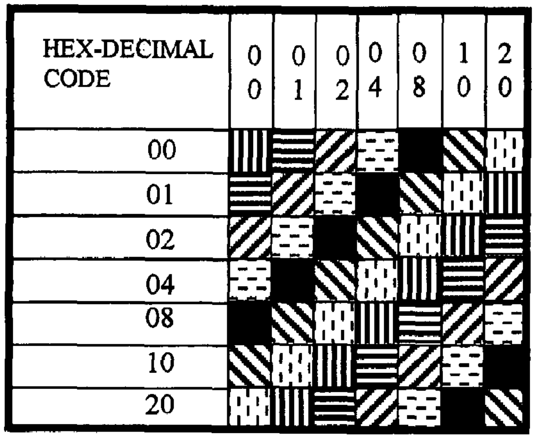
| HEX CODE | 00 | 01 | 02 | 04 | 08 | 10 | 20 |
|---|---|---|---|---|---|---|---|
| **00** | 00 | 3E | 3D | 3B | 37 | 2F | 1F |
| **01** | 3E | 01 | 3C | 3A | 36 | 2E | 1E |
| **02** | 3D | 3C | 02 | 39 | 35 | 2D | 1D |
| **04** | 3B | 3A | 39 | 04 | 33 | 2B | 1B |
| **08** | 37 | 36 | 35 | 33 | 08 | 27 | 17 |
| **10** | 2F | 2E | 2D | 2B | 27 | 10 | 0F |
| **20** | 1F | 1E | 1D | 1B | 17 | 0F | 20 |
[blank box] OR (IF HEX1 = HEX2)
[dotted box with ⊙] EXCLUSIVE NOR (IF HEX1 ≠ HEX2)
BOOLEAN FUNCTION
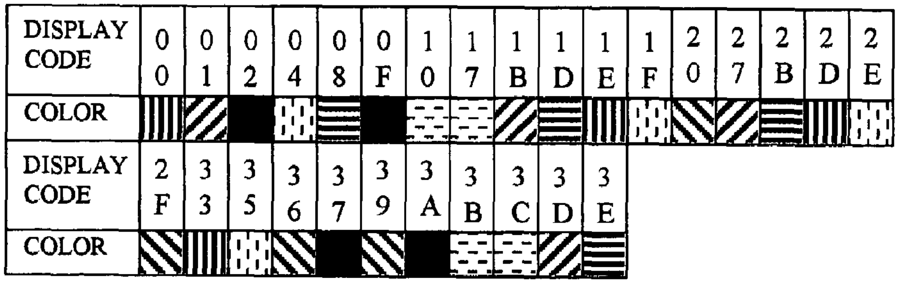
7 X 7 - SEVEN COLOR OPERATION – HEX CODE
Figure – 25 -

| PLAYFIELD | # OF COLORS | FIGURE | BOOLEAN FUNCTION |
|---|---|---|---|
| 3 x 3 | 3 | 21 | IF BN1 = BN2: AND<br>IF BN1 ≠ BN2: EXCLUSIVE NOR |
| 3 x 3 | 6 | 20 | <u>IF BN1 = BN2:</u><br>LEFT BIT: EXCLUSIVE NOR<br>2 RIGHT BITS: AND<br>IF BN1 ≠ BN2: EXCLUSIVE NOR |
| 4 x 4 | 4 | 22 | EXCLUSIVE OR (XOR) |
| 4 x 4 | 7 | 19 | LEFT BIT: EXCLUSIVE NOR<br>2 RIGHT BITS: EXCLUSIVE OR |
| 5 x 5 | 6 | 23 | <u>IF BN1 = BN2:</u><br>FIRST BIT: EXCLUSIVE NOR<br>4 RIGHT BITS: OR<br>IF BN1 ≠ BN2: EXCLUSIVE NOR |
| 6 x 6 | 7 | 24 | <u>IF BN1 = BN2</u>:<br>FIRST BIT: EXCLUSIVE NOR<br>SECOND BIT: EXCLUSIVE OR<br>2 RIGHT BITS: OR<br><u>IF BN1 ≠ BN2</u>:<br>FIRST BIT: EXCLUSIVE NOR<br>SECOND BIT: EXCLUSIVE OR<br>2 RIGHT BITS: EXCLUSIVE NOR |
| 7 x 7 | 7 | 25 | IF HEX1 = HEX2: OR<br>IF HEX1 ≠ HEX2: EXCLUSIVE NOR |
| 8 x 8 | 10 | 26 | LEFT BIT: EXCLUSIVE NOR<br>3 RIGHT BITS: EXCLUSIVE OR |

Figure – 27 -

8 X 8 - SEVEN COLOR OPERATION – 4 BITS

INTERACTIVE SLOT MACHINE

This utility application benefits from provisional application of U.S. Ser. No. 60/494,355, filed on Aug. 12, 2003.

BACKGROUND OF THE INVENTION

This invention relates generally to coin operated gaming machines, also known as slot machines, and in particular to a coin operated gaming machine wherein a coin input device, a start lever, a plurality of switches, a plurality of displays and a coin hopper are provided. It is possible through the coin input device and by the activation of the start lever to initiate a sequence of mechanical and/or electrical actions (tasks), including random events, such that a plurality of colors or symbols are indicated at said plurality of displays. It is also possible to predefine a plurality of geometric patterns, of said plurality of colors or symbols, as winning plays in order to control said machine to payout coins or tokens from said coin hopper.

Various coin operated gaming machines are known wherein a plurality of symbols is provided on the periphery of a plurality of rotating reels. The reels are randomly stopped and a win decision is made based on the combination of symbols stopping on a single line, or a plurality of winning lines. Electronic coin operated machines are also known wherein a micro-processor is used to control the functions performed by the machine and a video display is being provided to depict the action of the rotating reels. Since these machines are based on the same rotating reels concept, which has not changed in many years, it is one object of this invention to provide a totally different method to control the actions of coin operated gaming machines and to, also, provide a plurality of new displays and features.

It is another object of this invention to provide a coin operated gaming machine, which allows the player to place a bet on a specific color or symbol or on a plurality of colors or images.

It is also an object of this invention to provide a coin operated gaming machine, which includes a mechanism to control the probability of occurrence of winning combinations of colors or symbols. Such mechanism will enable the operator of the machine to vary the payout rate, namely, the ratio of the number of coins to be paid out to the whole number of coins spent for games.

It is still another object of the present invention to provide a coin operated gaming machine that utilizes cyclical control, which automatically adjusts said probability of occurrence of winning combinations based on the actual payout rate for the machine.

It is also another object of this invention to provide a coin operated gaming machine that affords the player, upon the deposit of one or a plurality of additional coins, a plurality of chances to activate a plurality of switches that are associated with the playing positions in order to enhance the player's chances of winning.

It is a further object of the invention to provide a coin operated gaming machine that provides the player with a mechanism to prematurely terminate a game, and base any winning combinations on the display that results from said premature termination of the game.

It is another object of the present invention to provide a variety of visual and audible signals for the enjoyment of this coin operated gaming machine.

It is still a further object of the present invention to provide a coin-operated machine, which includes a "JACK POT" prize. The amount of this prize progressively increases as the number of deposited coins, over time, increases without winning the prize.

SUMMARY OF THE INVENTION

The foregoing and other objects of the invention are accomplished by a coin operated gaming machine, which is based on the concept and a logic game presented in U.S. Pat. No. 5,286,037 ('037 Patent). For demonstration purposes only, this game is graphically represented by a two-dimensional geometric square as shown in FIG. 1. Therefore, the present invention relates to an electronic gaming device comprising a predefined first set of binary codes, random elements to assign said predefined first set of binary codes to playing positions, a plurality of logical mechanisms to select and route pairs of binary codes to each other, a plurality of switches to activate said logical mechanisms, a mechanism to generate a second set of binary codes, referred to herein as display codes, from said first set of binary codes, using a Boolean function, a lookup table, or the like, a mechanism to assign said display codes to display locations, and a plurality of display locations, each of which is capable of displaying a plurality of colors or images. The object of this logic game, as presented in the '037 patent, is for a player to manipulate the switches to determine an exact combination of switch's activations that results in a singular color or image being indicated at all display locations.

In the present invention, upon the deposit of a coin, or a plurality of coins, and upon the activation of the start lever, and for a random duration of time, the gaming device generates a sequence of random decimal numbers between 1 and M, wherein M represents the total number of playing positions or display locations. The device then sequentially activates the switches located at playing positions corresponding to these random numbers until the expiration of said random time duration. After each switch's activation, the device activates the displays in accordance with the values of the display codes assigned to the various playing positions. Upon the expiration of the random time duration, the device utilizes the pattern of the displays resulting from the last switch activation to determine if there is a prize-winning combination of colors or images. A prize-winning combination exists when a predefined pattern of a color or an image is present at the display, and when such color or image had been selected by the player. An example of display winning combinations for the preferred embodiment is provided in FIG. 15.

In accordance with a preferred embodiment of the invention, there is provided a coin operated gaming machine, which is based, in part, on the logic concept described in the '037 Patent. The machine utilizes a microprocessor programmed to randomly assign predefined set of binary codes to playing positions. The microprocessor is also programmed to route selected pairs of said binary codes to each other, and generate display codes to activate the indicators at the various playing positions. It should be noted that there are numerous ways to assign the display codes to playing positions, including random assignments, and predefined assignments.

Since the payout rate is dependent on the probability of occurrence of winning combinations of colors or images, the microprocessor utilizes a plurality of parameters to randomly affect said winning combinations. One of these parameters is how to assign the first set of binary codes to playing positions. Accordingly, the microprocessor is programmed to provide a plurality of optional initial settings, each of which places certain constraints on said assignment of binary codes to playing positions. For example, an initial setting that removes all constraints for such assignment, results in an increase in the probability of occurrence of a larger number of dark indications. It should be noted that the reference to a "dark" indication is only an example. The "dark" indication described in the '037 Patent represents certain indicating states, which could be represented by any other color or image.

In addition, in the absence of said constraints, there may not be a solution to the logic problem disclosed in the '037 Patent. Which means that, for certain code assignments, there is no combination of switches that results in a singular color or image being displayed at all playing positions. Therefore, this initial setting will result, over time, in a lower payout rate. The microprocessor is also programmed to permit the player to bet on a single color or image, or a plurality of colors or images, the pattern of which determines how many coins, if any, will be paid out. Further, as an optional feature, the player will be allowed to prematurely terminate a game in progress by activating any of the switches associated with playing positions.

The preferred embodiment also includes an optional initial setting which, when selected, will randomly rearrange the apparent positions of the displays. This random rearrangement has the effect of distributing the colors or images more uniformly among the displays. Which means that the probability of a singular color or image being displayed at a single row, single column, or on a diagonal decreases.

Since the device keeps track of the cumulative number of coins dispensed, the microprocessor is programmed to provide an initial setting that automatically controls the payout ratio to a preset or desired level. Such preset or desired level could be selected manually using a selector switch, or remotely using secured coded control wiring. If such initial setting is selected, the microprocessor will continuously compute the actual payout rate and will automatically cycle the machine between a plurality of initial settings based on the actual payout rate, and a plurality of predefined payout rate levels, such that when any of these levels is reached, the microprocessor will automatically select a new parameters that may increase or decrease the payout rate as the case may be.

The preferred embodiment also provides a "JACK POT" prize with a progressively increasing amount. Upon the activation of the start lever, the microprocessor is also programmed to generate a sixteen digit random binary number. These digits are then compared to the statuses of the routing elements and a "LUCKY 7" is generated and displayed at all play locations where a match occurs. The "JACK POT" is paid when all display locations are indicating a "LUCKY 7" symbol. It should be clearly understood that the aforestated description of a "JACK POT" algorithm is being provided as an example, and is not intended to limit the invention herein. As would be understood by persons of ordinary skills in the art, different algorithms can be used to provide a "JACK POT" feature. For example, a "LUCKY 7" symbol can be displayed only if there is a match between the status of the routing element and the corresponding digit in the sixteen digit random binary number, and only if the corresponding playing position is displaying a dark or a blank indication. In such a case, the "JACK POT" is paid when all display locations are indicating a "LUCKY 7," and are also indicating a dark indication.

Another feature provided in the preferred embodiment is to afford the player, upon the deposit of a plurality of additional coins, a plurality of chances to activate switches associated with the playing positions. The microprocessor is programmed to generate new displays after each manual switch's activation, and to determine the number of coins to be paid out, if any.

In an alternative embodiment, the coin-operated machine comprises a color video display with a plurality of touch screen controls whereon a plurality of pictorial images may be displayed. Said plurality of images may include traditional slot machine symbols such as single bar, double bar, triple bar, cherry, etc.

It should be noted that as the number of playing positions increases, the number of colors or images that can be displayed, also, increases. For example, for a 5×5 playing positions, up to 5 primary colors or images, in addition to a dark or blank indication, may be used as indicated in FIG. 23. In lieu of the dark indication, the designer may elect to provide secondary colors or images. This is done by simply assigning display codes corresponding to the dark or blank indication to said secondary colors or images. Similarly, for an 8×8 playing positions, up to 8 primary colors or symbols, in addition to a dark or blank indication may be used. FIG. 28 indicates a display code assignment for an 8×8 playing positions, including eight (8) primary colors, two (2) secondary colors, and a dark or blank indication. In either of these two examples, and if no special constraints are imposed on the assignment of binary codes to playing positions, each of the primary colors or images will have an equal probability of occurrence. A dark or a blank indication will have a higher probability of occurrence. A primary color or image is defined by a display code assignment that guarantees the probabilistic occurrence of a display wherein all playing positions are indicating said primary color. Further, when only primary colors are used, and the remaining display codes are assigned to a dark or a blank indication, the probabilistic occurrence of a display wherein all playing positions are indicating a dark or a blank indication is also guaranteed.

In addition, the maximum number of colors or images (primary and secondary colors or images) is limited by the length (number of bits) of the display code. For example, for a 4×4 playing positions, and for a display code of three bits, the maximum number of colors or images is eight (8), consisting of four (4) primary colors or images, and four (4) secondary colors or images. Similarly, for an 8×8 playing positions, and for a display code of four bits, the maximum number of colors or symbols is sixteen (16), consisting of eight (8) primary colors or images, and eight (8) secondary colors or images. When secondary colors or images are used, the probability of occurrence of a winning combination of said secondary colors or images is less than the primary colors or symbols. Also, certain winning combinations may not occur for secondary colors. A secondary color or image is defined as a color or an image corresponding to a display code that would normally be assigned to a dark or blank indication.

Further, it would be obvious to a person of ordinary skills in the art that a display can be designed without the use of a dark or a blank indication as indicated in FIGS. 21, 22 & 25. This is accomplished by simply assigning the display codes that would normally be assigned to a dark (or a blank indication if a video display is used) to one or more secondary colors or images. Furthermore, the technique of assigning multiple display codes to the same color or image can be used to vary the probability of occurrence of a winning combination of a color or an image (primary or secondary) as indicated in FIG. 28.

Similar to conventional slot machines, the present invention can be implemented as a primary coin operated gaming machine, which also provides a bonus game. The bonus game is activated when a predefined winning combination of colors or images occur. For example, if one of the images represents the wheel of fortune, and if said image is displayed at all locations on a row, column, diagonal, or the like, then a wheel of fortune bonus game is activated. In that respect, any bonus game could be used with the present invention. Alternatively, the present invention could be implemented as a bonus game to a conventional coin operated gaming machine.

BRIEF DESCRIPTION OF THE DRAWINGS

These and other more detailed and specific objectives will be disclosed in the course of the following description taken in conjunction with the accompanying drawings wherein:

FIG. 15 is tabulation of winning combinations for a color or image.

FIG. 22 is a lookup table of display code assignments for a 4×4 playing positions, indicating the display code assignments for four (4) primary colors, including a dark indication.

FIG. 25 is lookup table of display code assignments for a 7×7 playing positions, indicating the display code assignments for seven (7) primary colors, and using hex-decimal numbers in lieu of binary numbers.

FIG. 27 is a tabulation of a Boolean function used to generate display codes from binary codes for 4×4, 5×5, 6×6, 7×7 & 8×8 playing positions.

DESCRIPTION OF THE PREFERRED EMBODIMENT

Figure 3:
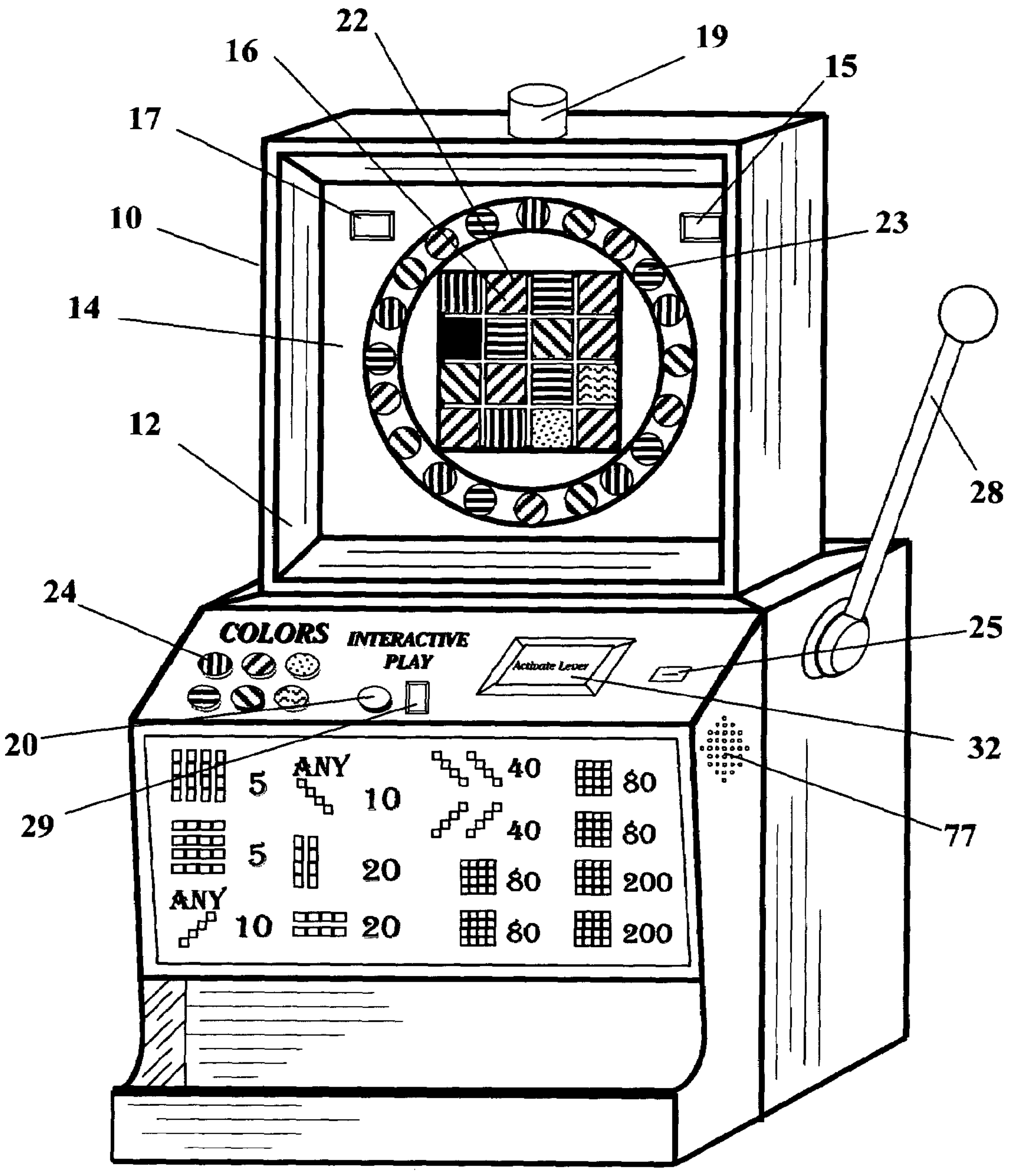
FIG. 3 is a perspective view of the preferred embodiment of a coin operated gaming machine according to the invention.
Figure 4:
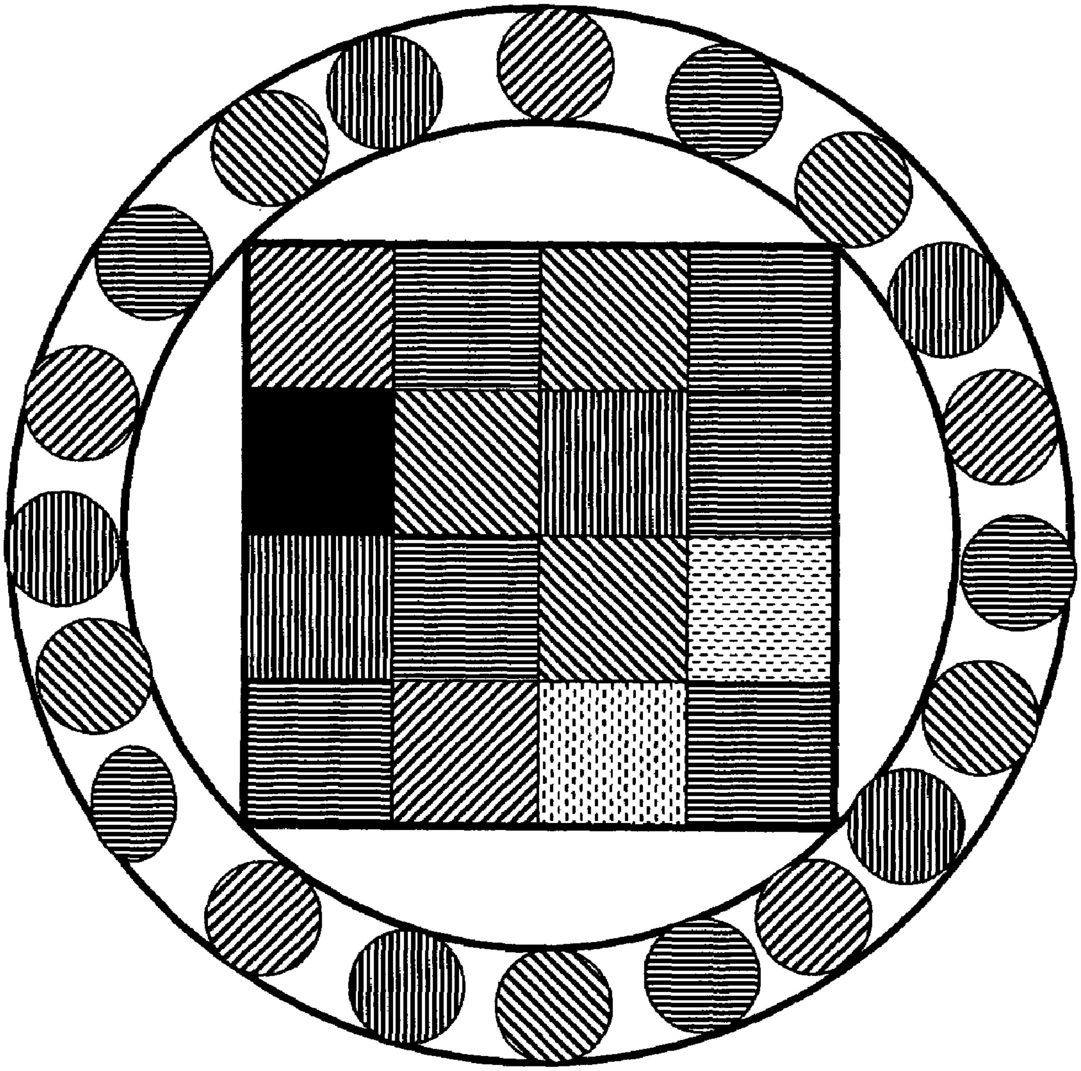
FIG. 4 is a view of the graphic display for the preferred embodiment, indicating sixteen (16) playing positions, and an optional rotating wheel of colored lights.

Referring now to the drawings where the illustrations are for the purpose of describing the preferred embodiment of the invention and are not intended to limit the invention hereto, FIG. 3 is a front plan view of a gaming machine 10 is comprised of a housing 12 having a face 14 and carrying an array of playing positions each of which consists of an indicator 16, and an individually operable momentary switch 22. Preferably, the switches and indicators are integrated in the form of lighted switches. In the specific embodiment illustrated in FIG. 3, and as also indicated in the display of FIG. 4, an array of four rows and four columns defines sixteen playing positions, each of which is associated with an individually operable lighted switch that may be referred to as 22-1 through 22-16; each row being numbered from left to right and from top to bottom.

Figure 19:
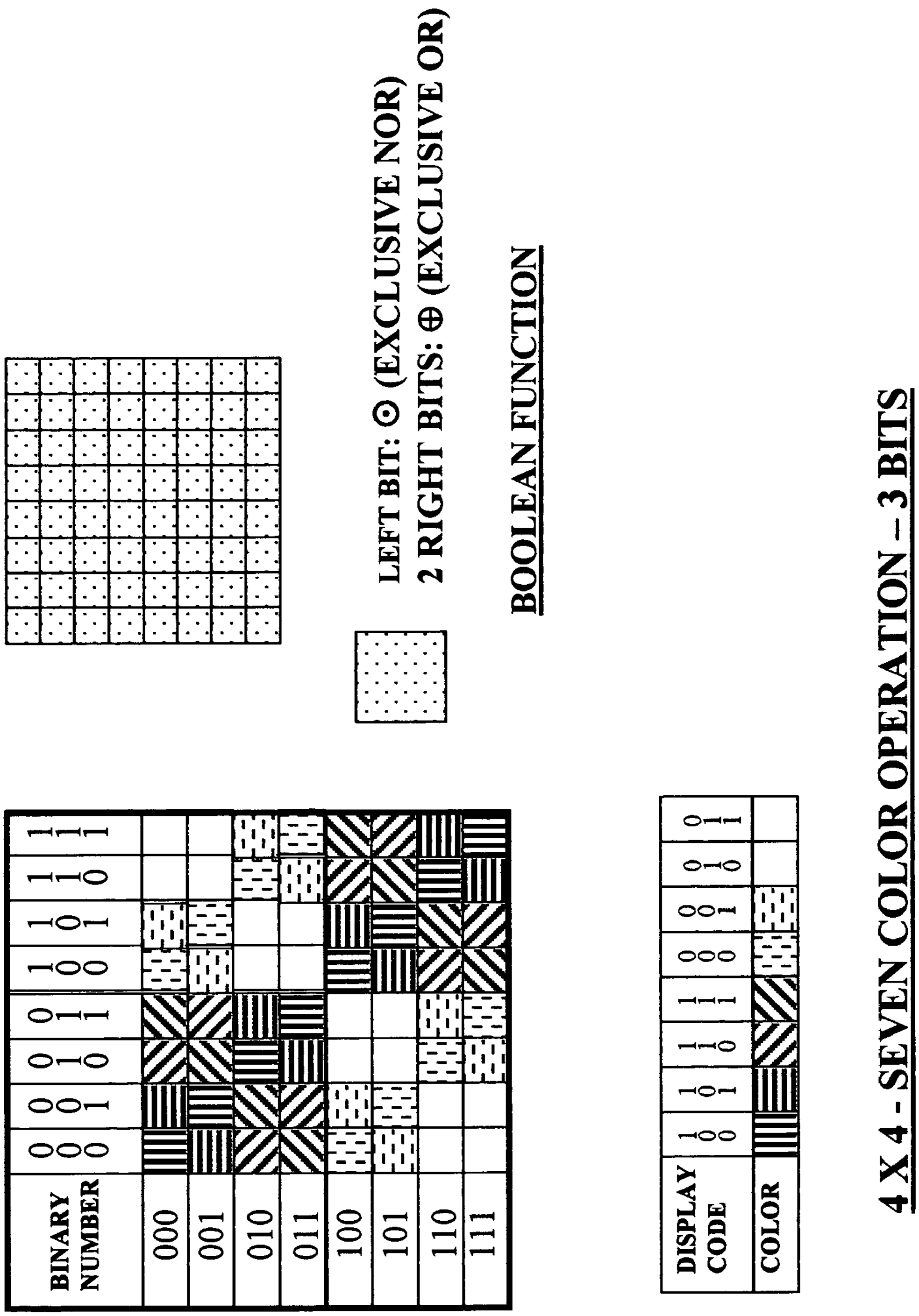
FIG. 19 is lookup table of display code assignments for a 4×4 playing positions, indicating the display code assignments for four (4) primary colors, two secondary colors, and a dark indication.
Figure 20:
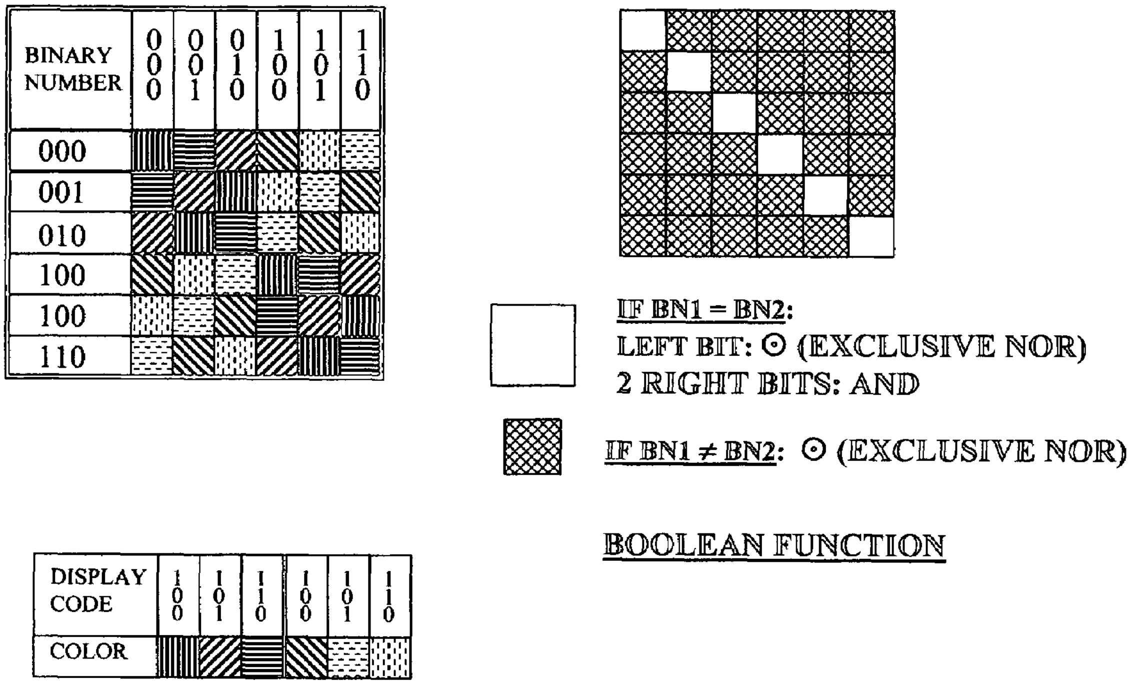
FIG. 20 is a lookup table of display code assignments for a 3×3 playing positions, indicating the display code assignments for three (3) primary colors, and three (3) secondary colors.
Figure 21:
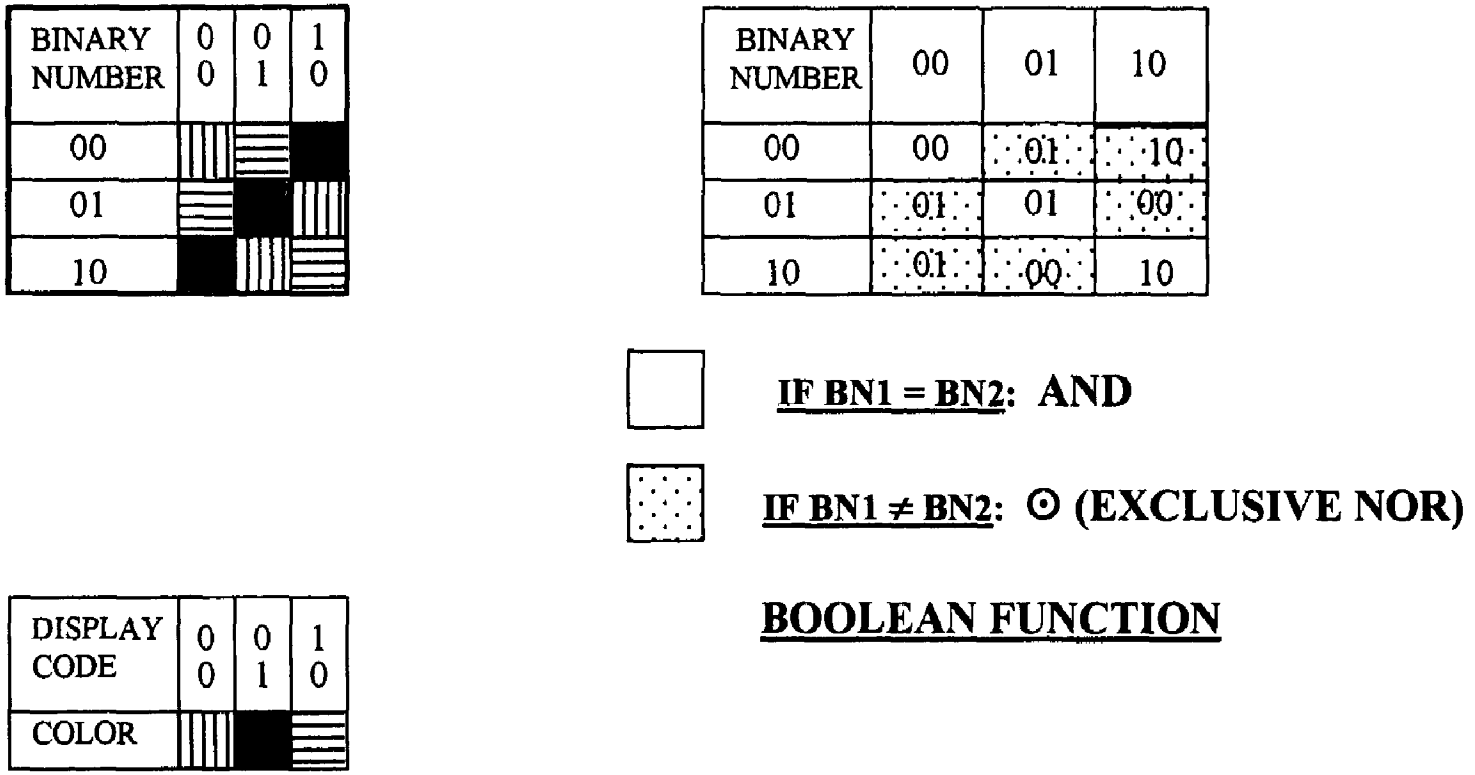
FIG. 21 is a lookup table of display code assignments for a 3×3 playing positions, indicating the display code assignments for three (3) primary colors.
Figure 23:
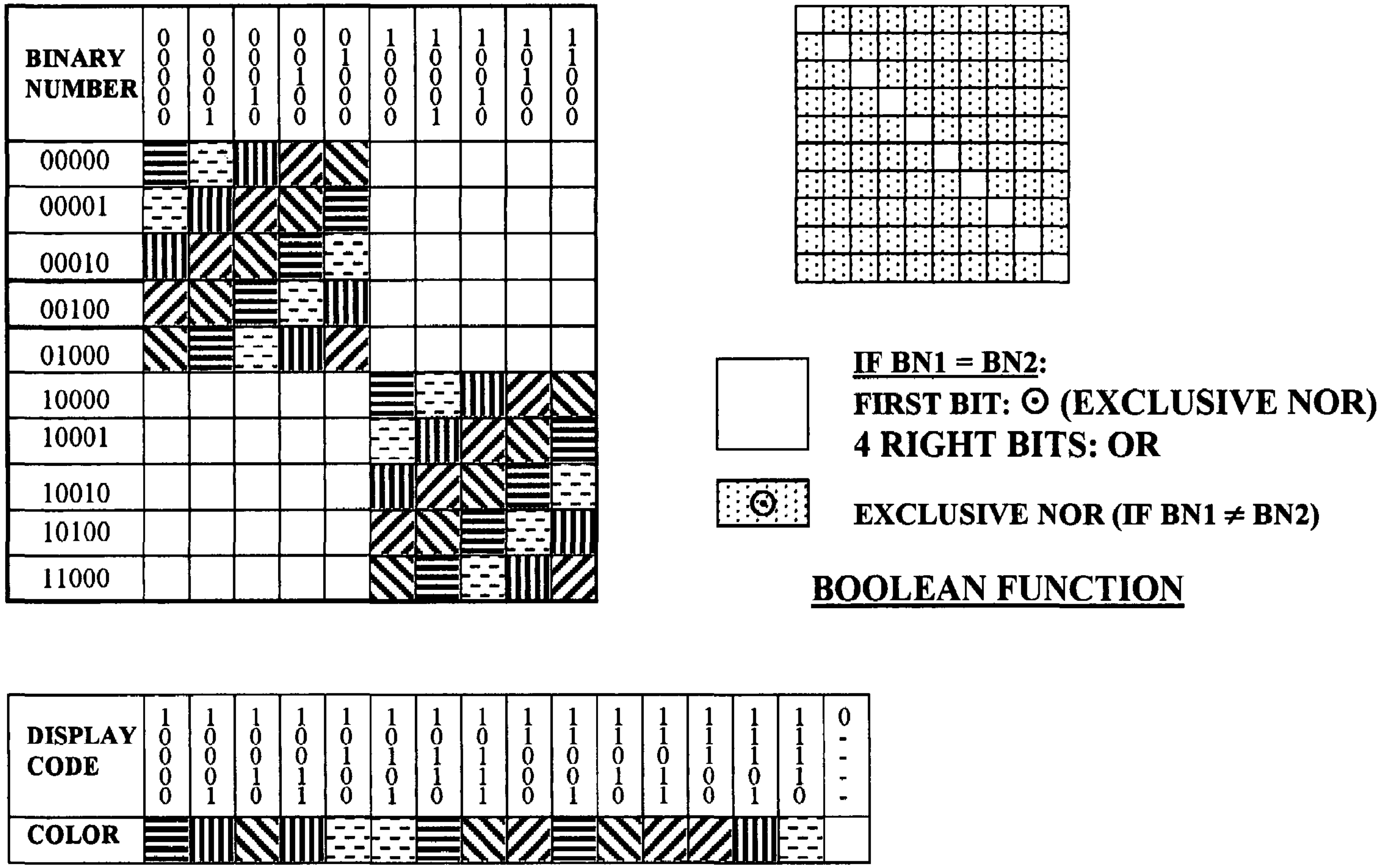
FIG. 23 is lookup table of display code assignments for a 5×5 playing positions, indicating the display code assignments for five (5) primary colors, and a dark indication.
Figure 24:
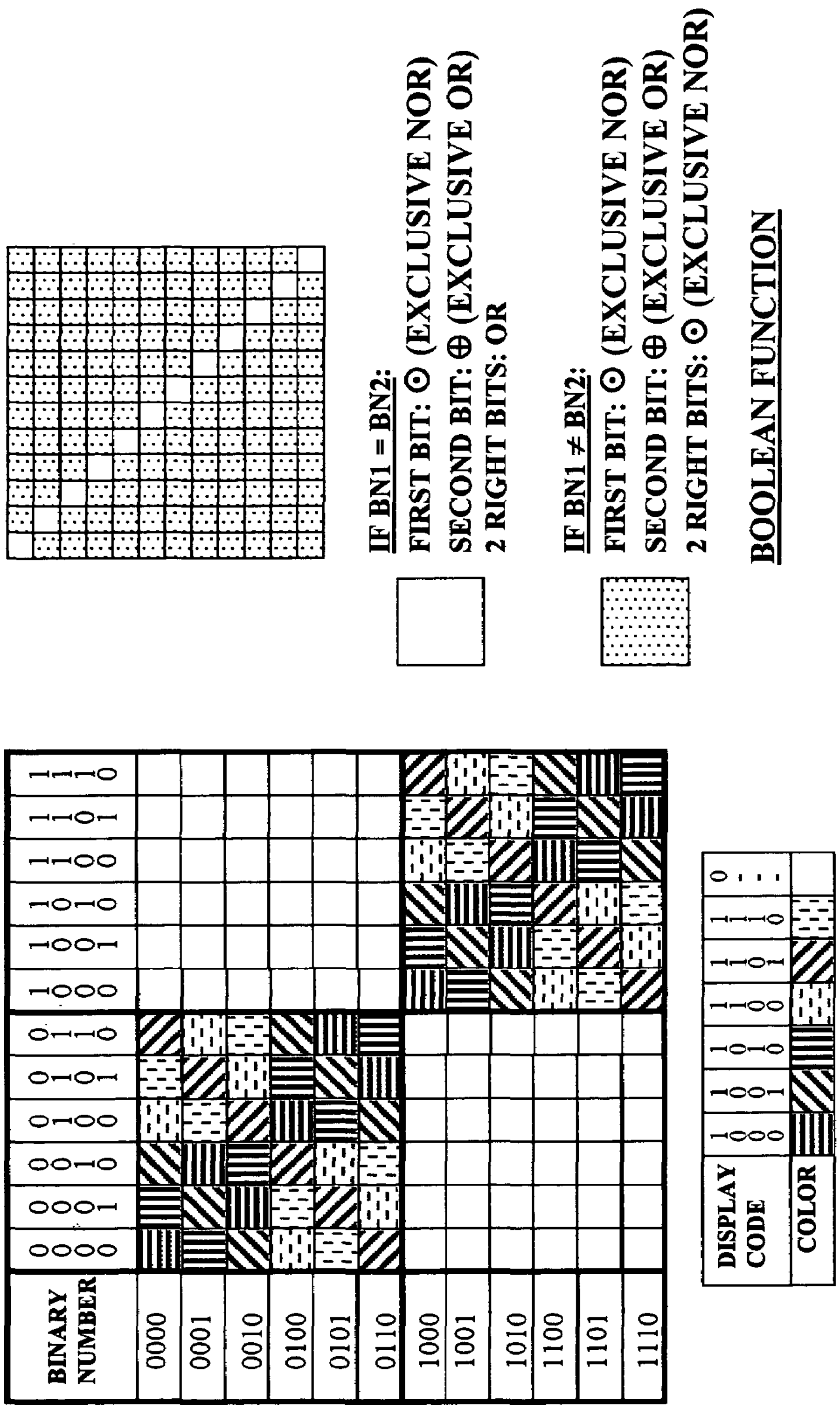
FIG. 24 is lookup table of display code assignments for a 6×6 playing positions, indicating the display code assignments for six (6) primary colors, and a dark indication.
Figure 26:
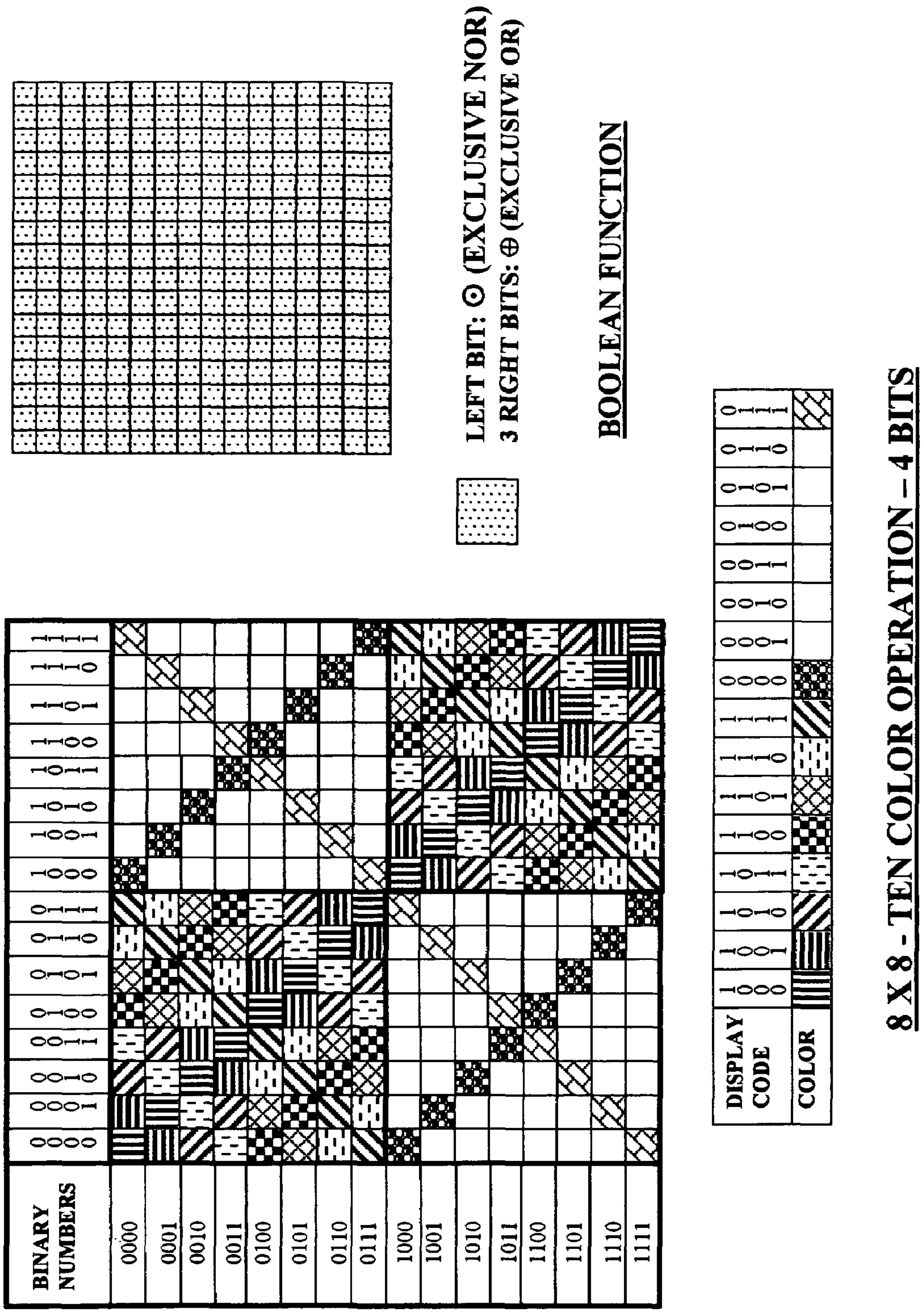
FIG. 26 is lookup table of display code assignments for an 8×8 playing positions, indicating the display code assignments for eight (8) primary colors, two (2) secondary colors, and a dark indication.

To operate the gaming machine, a player first selects one or more colors to bet on by activating the associated color selector switches 24. In the specific embodiment of FIG. 19, Six (6) color selector switches are being provided, one for each of the primary colors of red, green, yellow, and blue, and two for each of the secondary colors of orange and aqua, which may be referred to as 24-1 through 24-6. After each switch's activation, the player may insert one or a plurality of coins or tokens into a slot 25. A maximum number of deposited coins may be imposed for any particular color. The player may then elect to make use of the interactive feature of the device by the successive activation of the interactive selection switch 20. Each activation of said switch will afford the player one chance of interactive play. The player is then required to insert one or a plurality of coins or tokens into the slot before pulling a main activation lever 28. A maximum number of allowable interactive plays may be imposed, and an indicator 29 to display the number of interactive plays selected is provides. A Liquid Crystal Display (LCD) panel 32 provides the player with instructions and game information as to how many coins or tokens were accepted, how many opportunities the player has been afforded to manually activate the display switches, and how many coins were won. Pulling the lever 28 will initiate a sequence of tasks, including random events, resulting in the random activation of the logical or routing elements associated with the playing positions, and the generation of new states for the corresponding indicators. This sequence of tasks is repeated for a period of time upon the expiration of which a certain combination of colors will be displayed at the indicators. If a display pattern of a color selected by the player matches one of predefined winning patterns, the microprocessor of the gaming device determines that a win has occurred and activates the dispensing of a specified number of coins from a coin hopper 34 through a pay-out chute. The LCD panel 32 indicates to the player how many coins he or she had won and how many were dispensed. If the player had exercised the option of manually activating display switches, the device will generate a visual and/or audible indication to inform the player that he or she may start the interactive play. Upon the activation of any of the interactive play switches 22 associated with playing positions, a new combination of colors are displayed at the indicators 16 and the tasks of determining if a win had occurred and the dispensing of coins, if any, is repeated. This process continues until the player exhausts all chances afforded to him to manually activate the interactive play switches 22. At such time a new play may be initiated by pulling the lever 28. As an optional feature, after the activation of the lever, and before the termination of a game, the player may prematurely terminate the game by activating any of the switches associated with playing positions.

Figure 5:
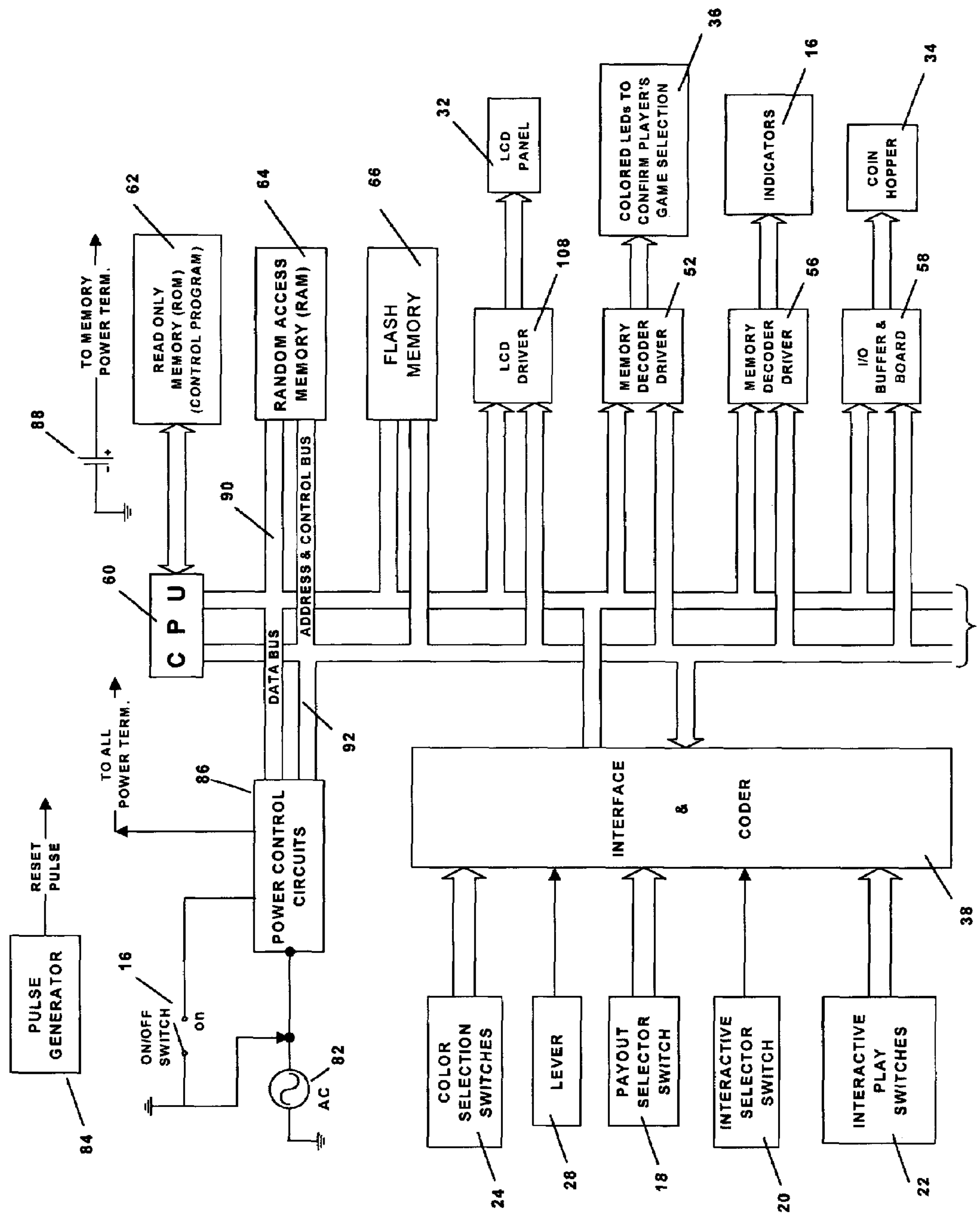
FIGS. 5 & 6 indicate block diagram of the microprocessor circuitry used to control the gaming machine according to the invention.
Figure 6:
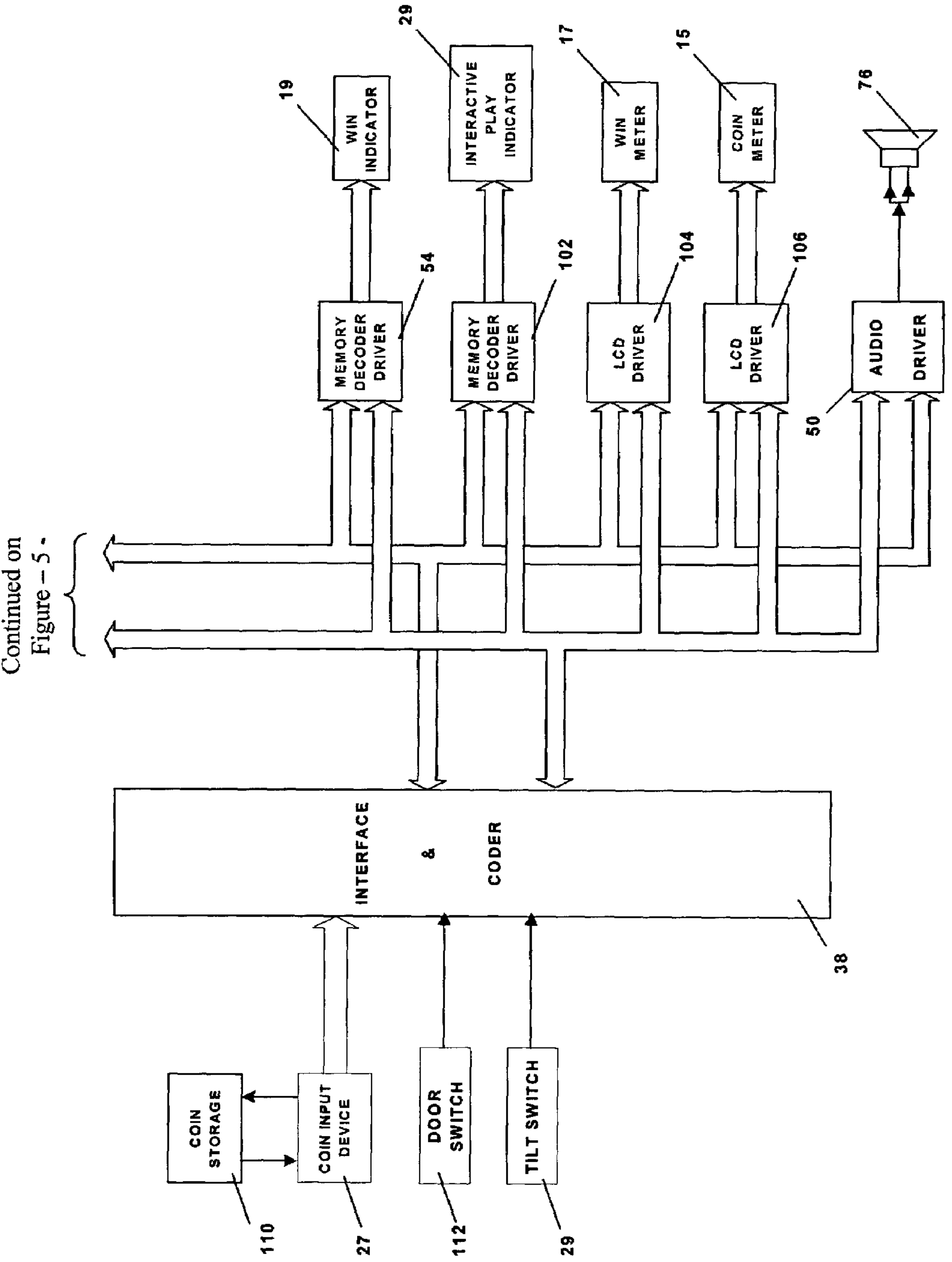
Figure 7:
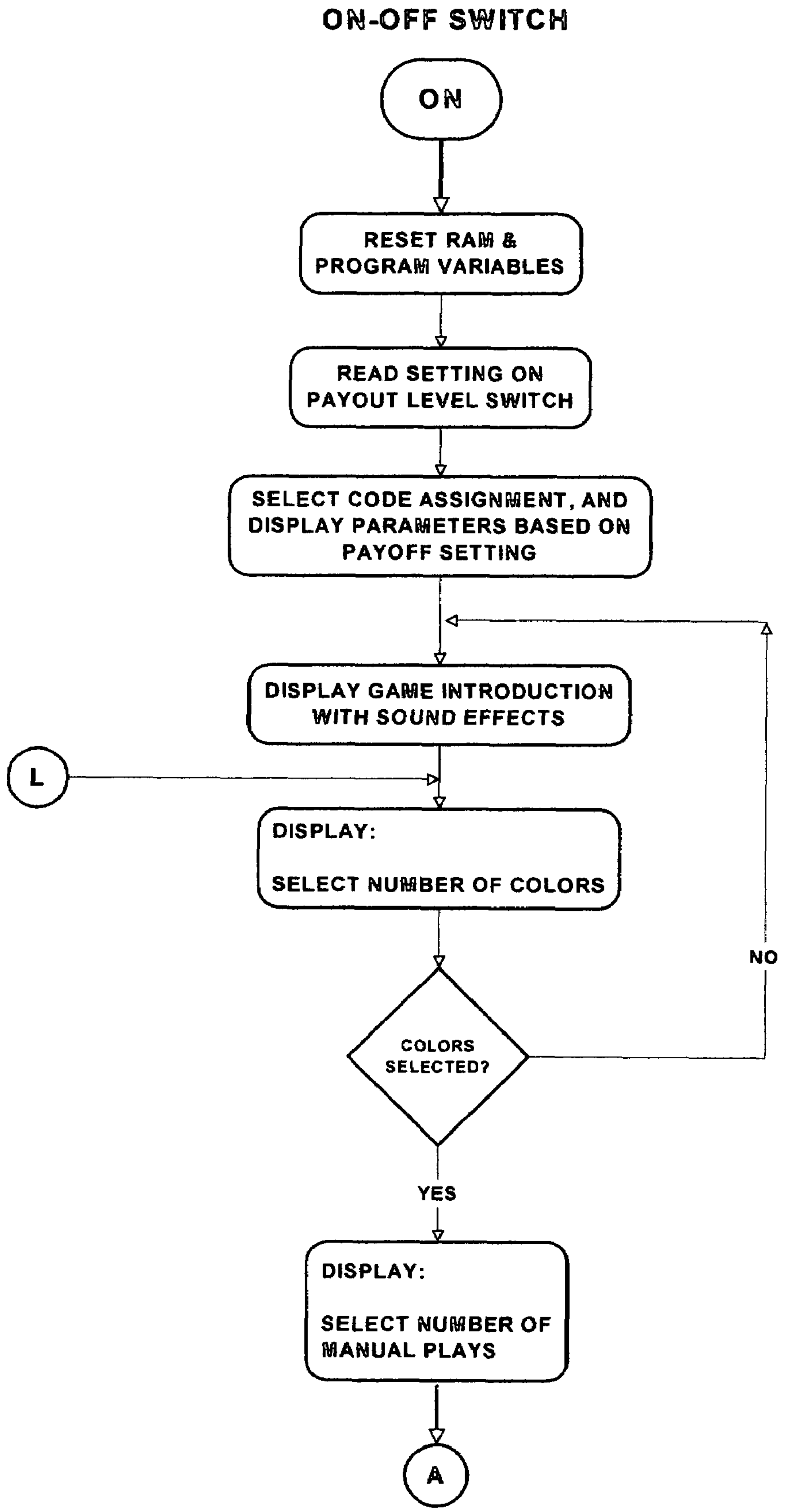
FIGS. 7-14 is a logical flow diagram illustrating the main program functions performed by the microprocessor controlling the gaming machine according to the invention.
Figure 8:
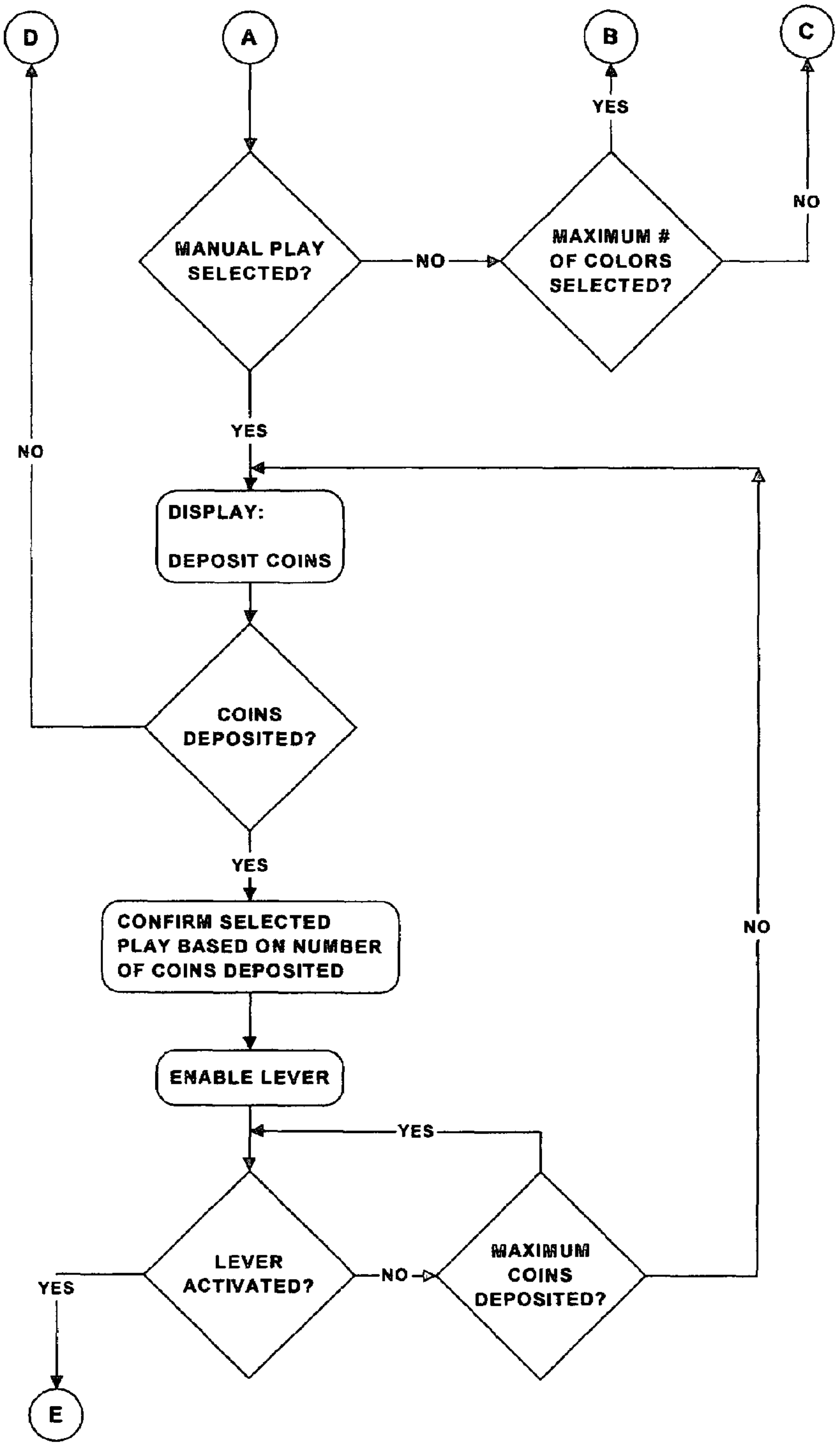
Figure 9:
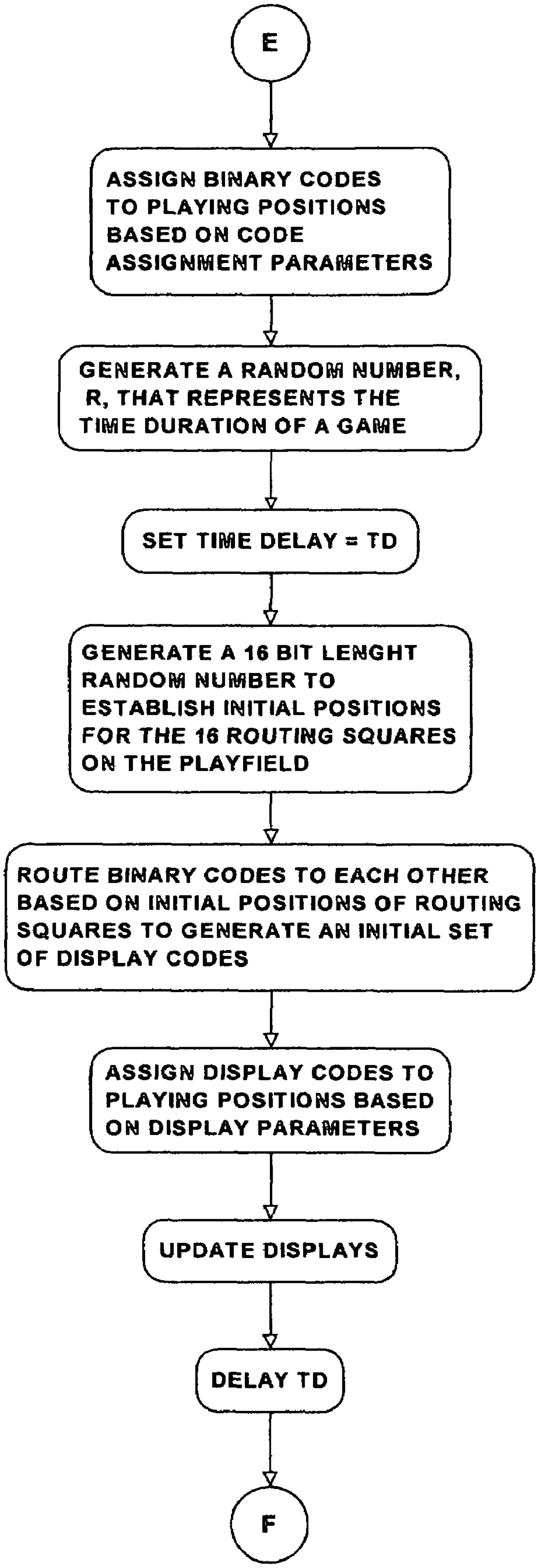
Figure 10:
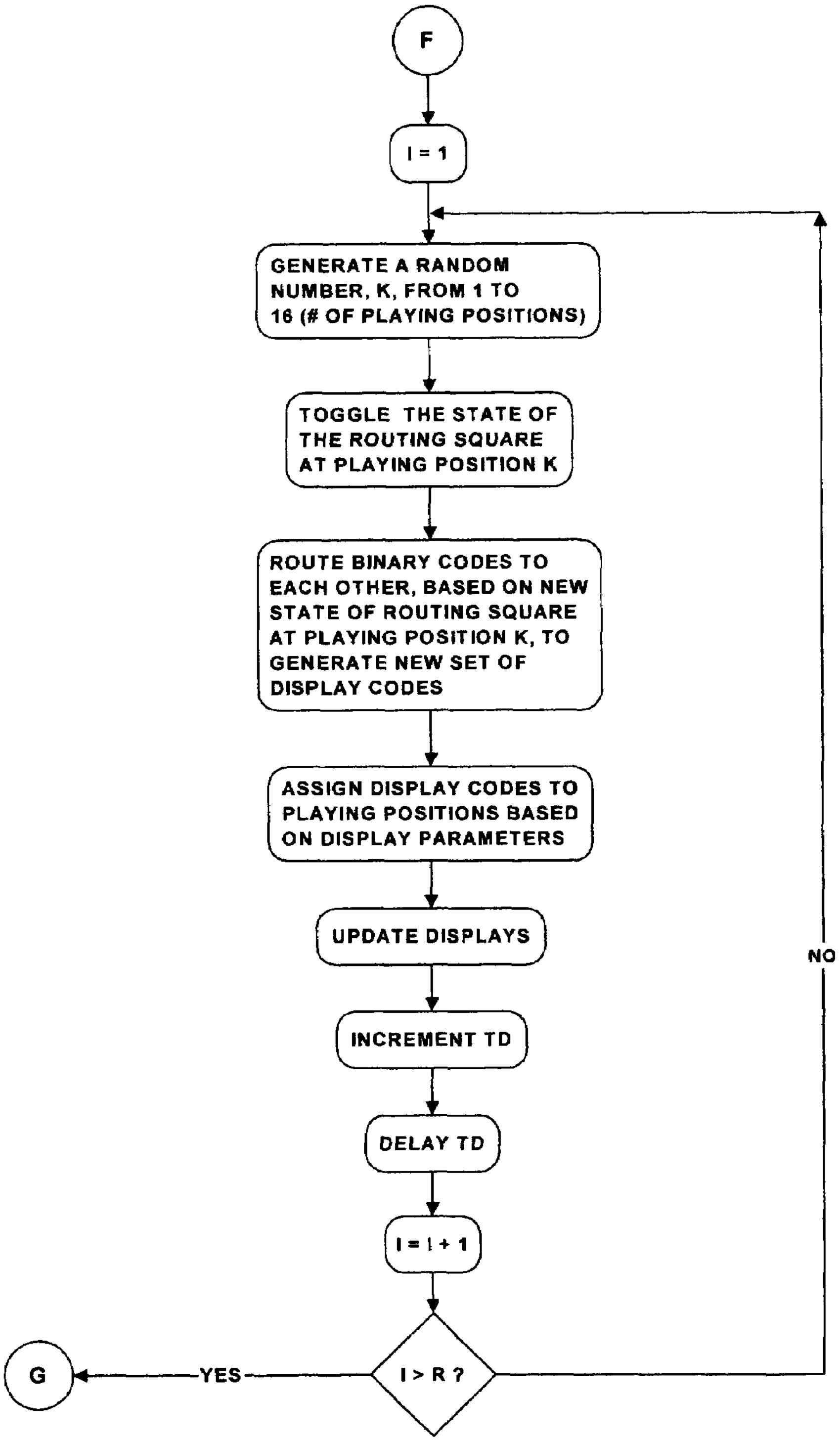
Figure 11:
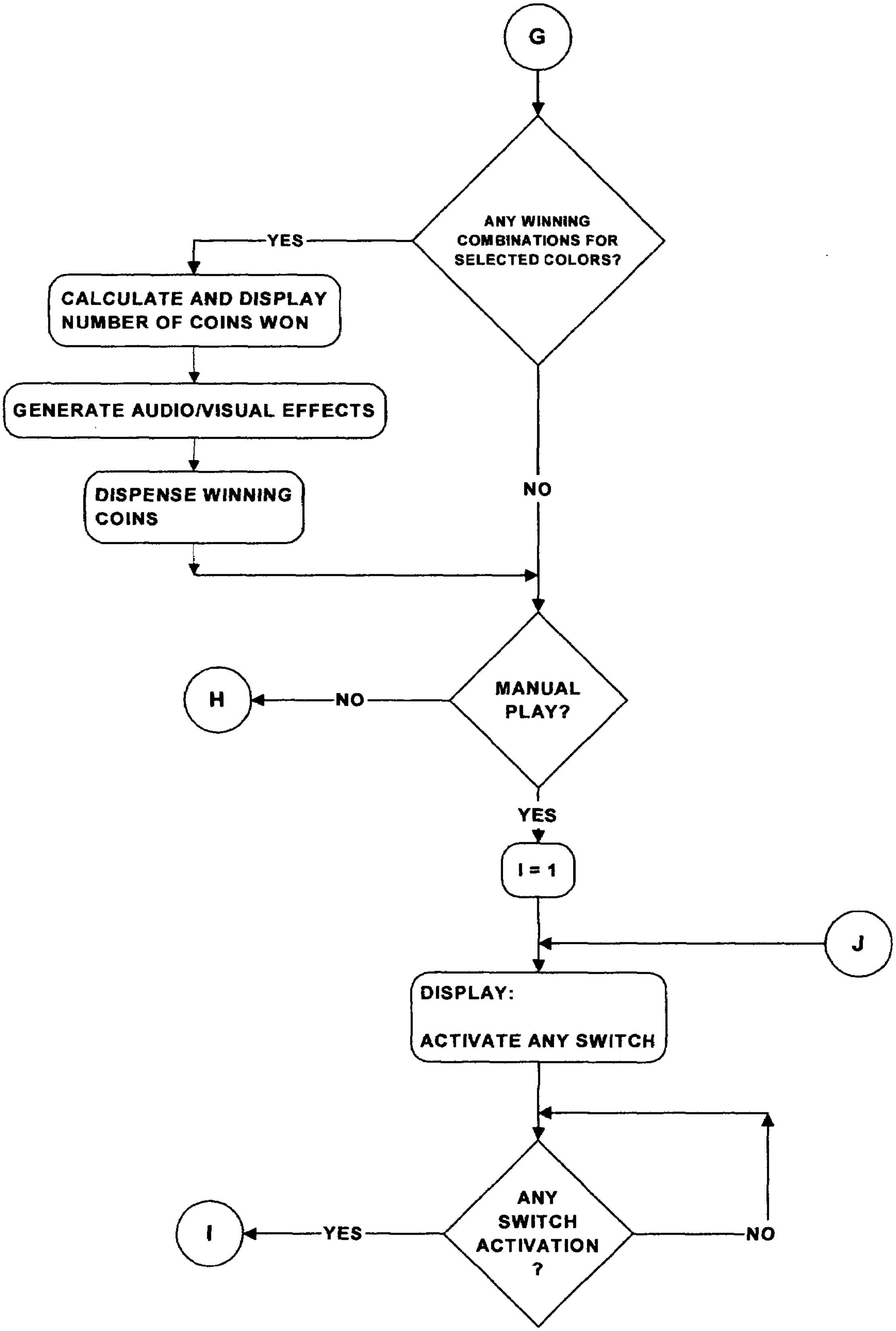
Figure 12:
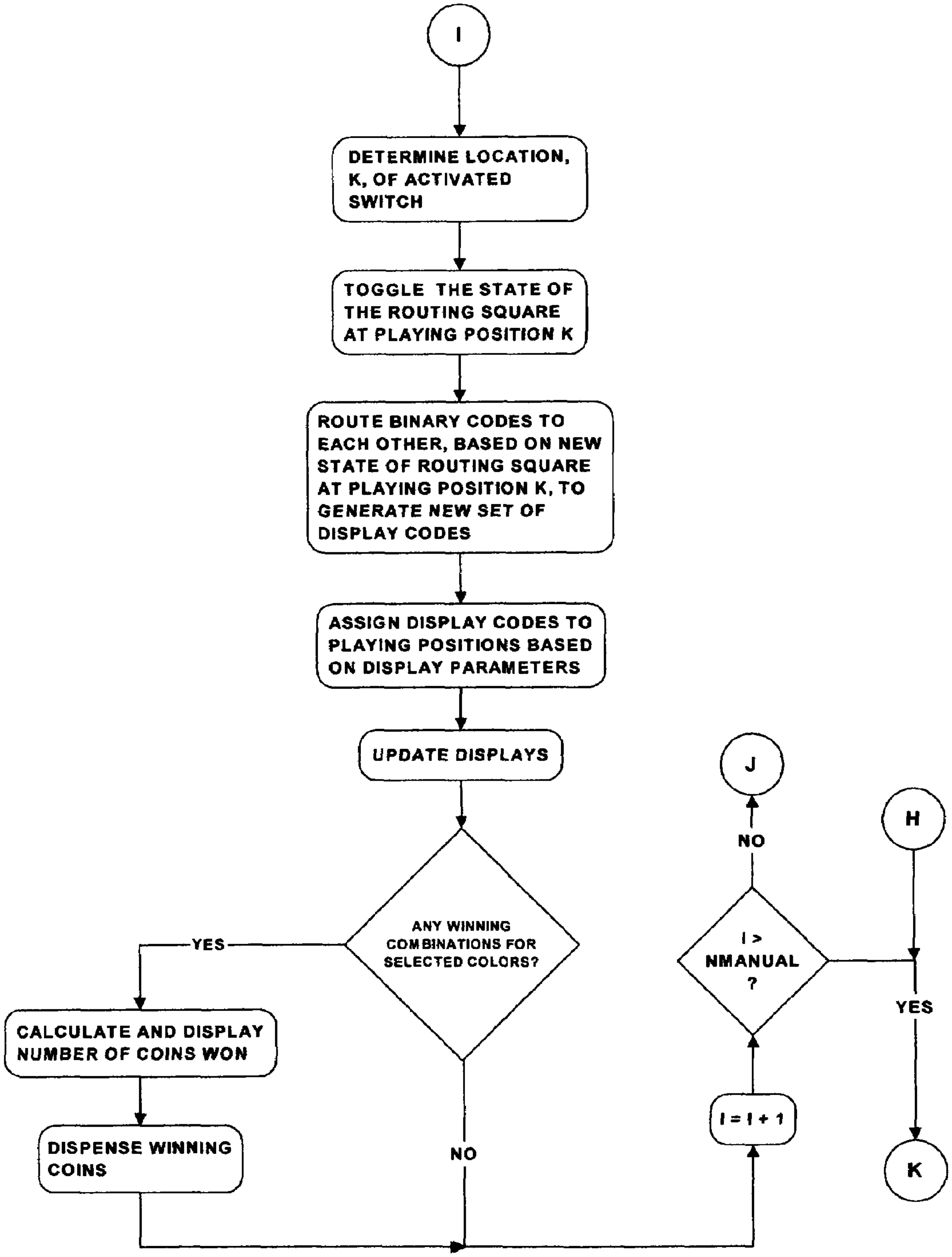
Figure 13:
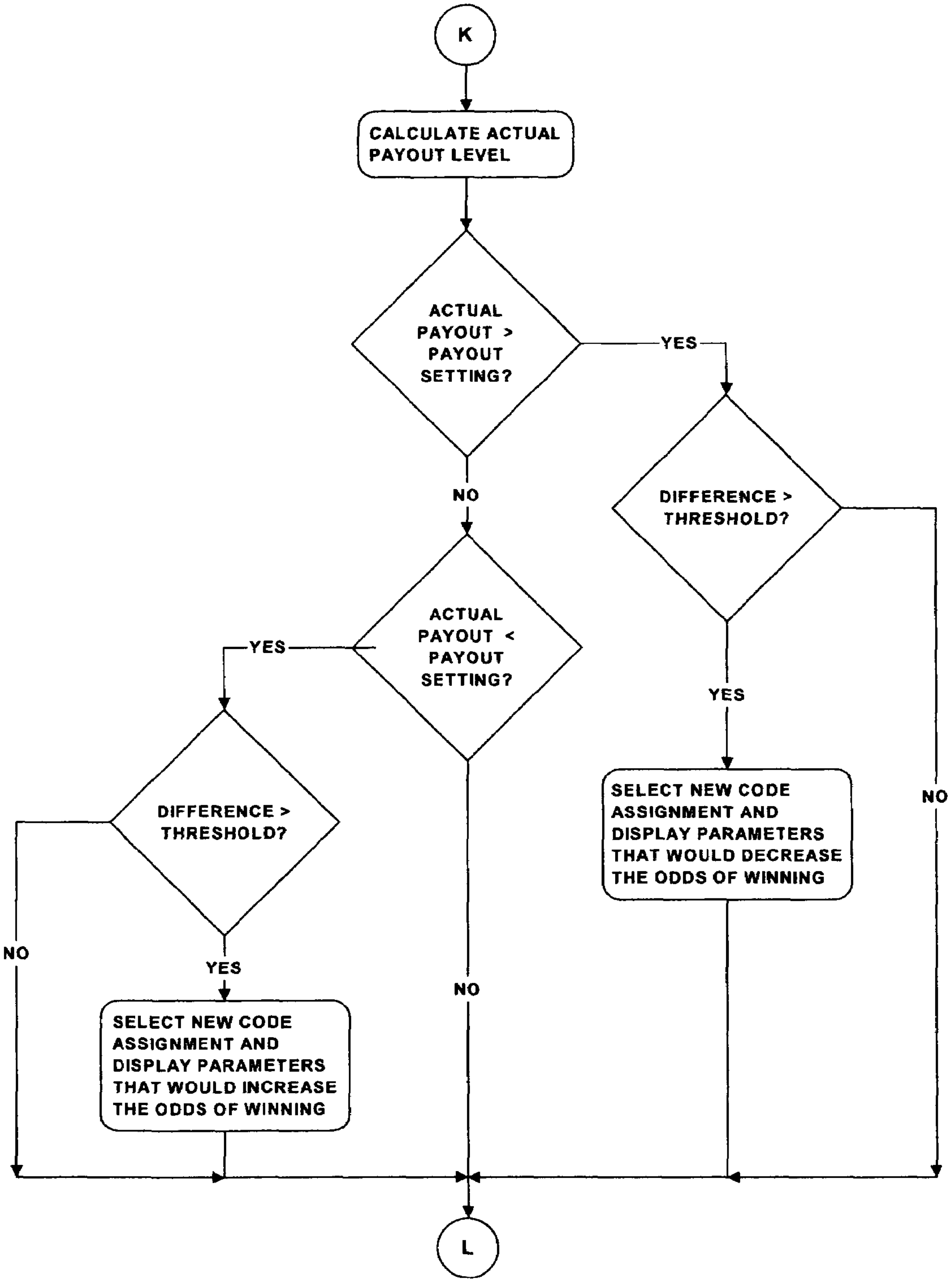
Figure 14:
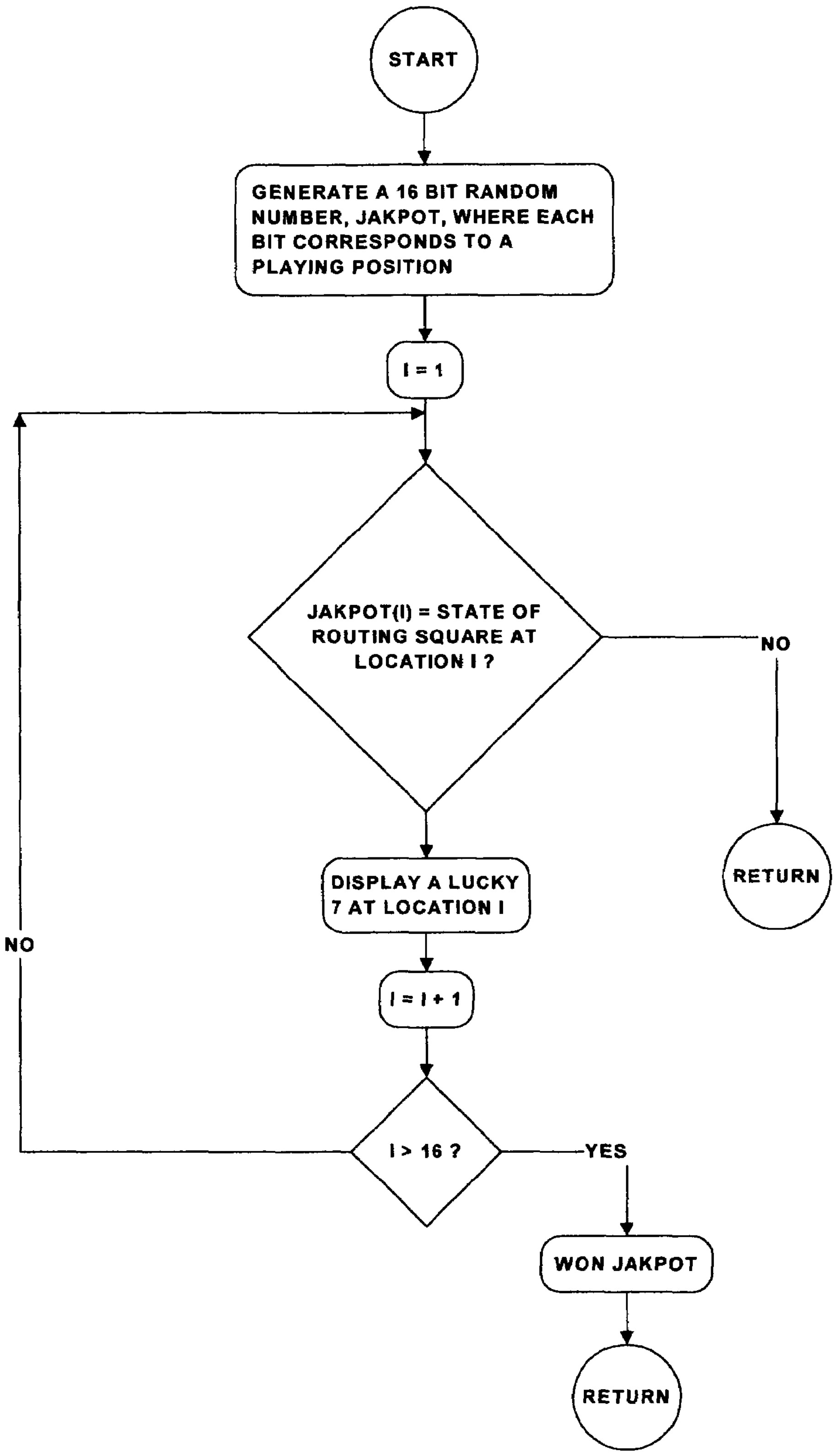

A block diagram of the control circuitry for this gaming device 10 is illustrated in FIGS. 5 & 6. This control circuitry includes a Central Processing Unit (CPU) or an Arithmetic Logic Unit (ALU), depending on the type of microprocessor or microcomputer utilized, 60 having a read only memory (ROM) 62, where the control program resides, a random access memory (RAM) 64, a flash memory 66, an interface and coding device 38, a plurality of memory decoder drivers 52, 54, 56 and 102, a plurality of LCD control drivers 104, 106 & 108, an audio driver 50, a slot I/O buffer, and a slot I/O board. The interface and coding devices 38 is used as an input interface between the interactive play switches 22, color selection switches 24, payout selector switch 18, main lever switch 28, door switch 112, tilt switch 29, and interactive selector switch 20, with the central processing unit 60. In contrast, the memory decoder device 56 is used as an output interface between the central processing unit 30 and the indicators 16; the memory decoder device 54 is used as an output interface between the central processing unit 30 and the win indicator 19; and the memory decoder device 52 is used as an output interface between the central processing unit 30 and six (6) color indicators 36. Additional drivers are provided to interface with the various LCD screens 15, 17 & 32, and the audio circuits that activate the loudspeaker 76. A common address and control bus 92, and a separate common data bus 90 are used to interconnect the central processing unit 30 with the interface and coding device 38, the memory decoder drivers 52, 54, 56 & 102, the read only memory (ROM) 62, the random access memory (RAM) 64, the flash memory 66, the LCD drivers 104, 106 & 108, and the audio driver 50. The central processing unit 30 controls the flow of all information throughout the entire system under the direction of the control program. The control program resides in the read only memory (ROM) 62.

The gaming device 10 includes a multi-character alphanumeric LCD display 32 mounted to the door of the gaming machine. The alphanumeric display 32 acts as a message center and is operable to provide status and instructional information during game play, and provide machine operation information to the operator thereof. Two additional displays are also provided to indicate to the player the number of coins used for the current game 15, and the total number of coins deposited and/or won up to the current game 17. The slot machine 10 further includes a coin input device 27, which is connected to a coin storage 110. The coin input device 27 is coupled to a coin slot to receive coins of one denomination, which are inputted through the slot 25. The coin input device 27 determines the validity of coins, the device being coupled to the coin hopper 34 to store valid accepted coins therein. The gaming device 10 further includes a switch, which is actuated in response to each accepted coin as the coin passes to the coin hopper for storage as described below. Each time the coin input switch is actuated a signal is communicated to the data bus 90 from the coin input device 27 so that the CPU 30 may update the RAM 64, and the flash memory 66.

The hopper 34 is controlled by the CPU 30 through slot input/output buffer, and a slot input/output board 58 to pay out coins through a pay out chute for winning game plays. The hopper 34 includes a switch, which is actuated each time a coin is paid out from the hopper. Each time the hopper switch is actuated, a signal is communicated to the data bus 90 from the hopper 34 indicating the pay out of a coin so that the CPU 30 may update the RAM 64, and the flashing memory 66 for the winning game play, number of coins won, number of coins played, and total number of coins credited to the player.

An on/off toggle switch 16 is provided to control the operational state of the gaming machine and the connection of the external AC power supply 82 to the electric circuitry. A loudspeaker 76 is positioned in the side portion of the housing and perforations 77 are provided to permit sounds from the loudspeaker 76 to issue from the housing.

With respect to the operation of this gaming machine, the logic steps utilized are illustrated in flow diagram form in FIGS. 7-14, which interconnect with each other at the places shown in the various figures. Even though specific reference will not be made to this diagram in the following description of the operation of the slot machine, periodic reference to this diagram may prove to be helpful to the reader hereof.

Referring again to FIGS. 5 & 6, in order to operate the machine, the ON-OFF switch 16 should be set to the "ON" position, which causes power to be supplied to all terminals of the device 10 from an external power source, and which causes a pulse generator 84 to generate a reset pulse. This pulse is applied to the central processing unit 30 and causes the central processing unit 30 to clear any data remaining in the RAM 64 and in the memory decoder drivers 52, 54, 56 & 102 over the common data bus 90. The flash memory 66, which stores critical information, including the current payout rate, number of coins credited to the player, etc., is not affected by this reset pulse.

Figure 1:
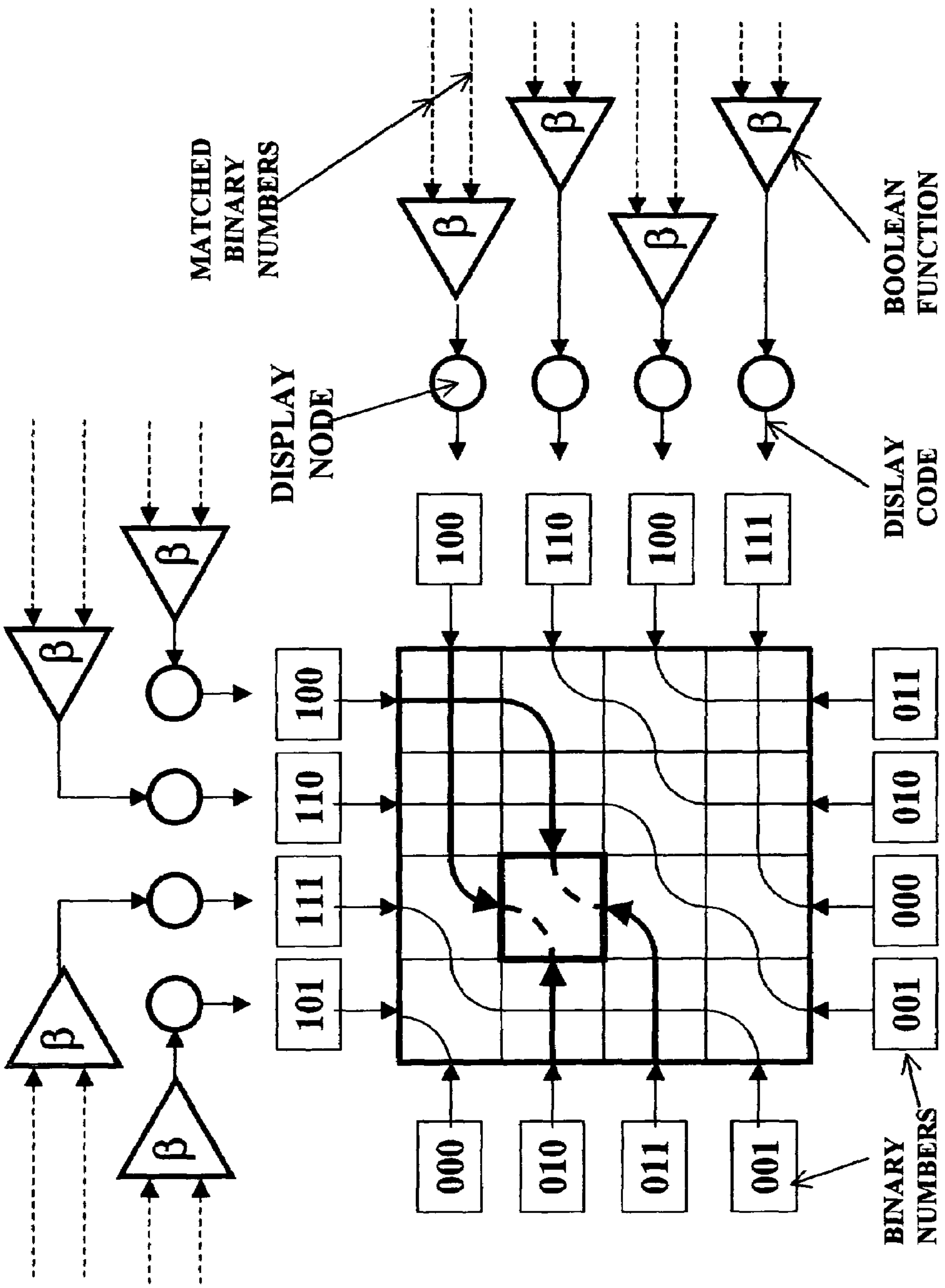
FIG. 1 is a geometric layout of the playfield, indicating assignment of binary codes to playing positions, and block diagram to generate display codes for the preferred embodiment.

After the resetting of program variables, the pulse causes the central processing unit 30 to read the setting on the payout selector switch 18, through the interface and coding device 38, over the address and control bus 92 and a signal is transmitted thereto via the data bus 90. The control program will then select an appropriate code assignment and display parameters based on said setting of the payout selector switch 18, and the current payout level stored in the flash memory 66. With respect to the code assignment parameters, and in the event the control program determines that the probability of occurrence of a winning combination should be increased, the microprocessor generates four (4) sets of random numbers. Each of said sets of random numbers comprises four (4) distinct decimal numbers from 1 to 4, and each of said distinct decimal numbers corresponds to a playing position (1 to 4) at an edge of the geometric playing field of the block diagram described in FIG. 1 such that the first set of random numbers corresponds to the four playing positions at the left edge of the playing field, the second set of random numbers corresponds to the four playing positions at the bottom edge of the playing field, the third set of random numbers corresponds to the four playing positions at the top edge of the playing field and the fourth set of random numbers corresponds to the four playing positions at the right edge of the playing field. The central processing unit 30 also assigns four predefined binary numbers 000, 001, 010 and 011, which are stored in ROM 62, to the four playing positions at the left edge of the playing field such that the binary number 000 is assigned to the location identified by the first decimal number of the first random set, the binary number 001 is assigned to the location identified by the second decimal number of the first random set, etc. Similarly, the four predefined binary numbers 100, 101, 110 and 111, which are stored in ROM 62, are assigned to the four playing positions at the bottom edge of the playing field, the four binary numbers 000, 001, 010 and 011, which are stored in ROM 62, are assigned to the four playing positions at the top edge of the playing field, and the four binary numbers 100, 101, 110 and 111, which are stored in ROM 62, are assigned to the four playing positions at the right edge of the playing field. It should be noted that this random assignment of binary numbers to playing positions at the perimeter of the playing field is disclosed for the purpose of describing a preferred embodiment. Other structures could be employed to provide an initial random set of codes. For example, the binary codes themselves could be randomly generated rather than being stored in ROM. Also, predetermined assignments could be provided and stored in ROM for a plurality of games. The control logic will then select any of such predetermined assignments at random. Further, it should be noted that the selection of binary numbers is solely for the purpose of describing the preferred embodiment. As would be obvious to a person of ordinary skills in the art, hex-decimal numbers could also be used as indicated in FIG. 25.

In the alternative, if the control program determines that the probability of occurrence of a winning combination should be decreased, then the microprocessor generates two (2) sets of random numbers. Each of said sets of random numbers comprises four (8) distinct decimal numbers from 1 to 8, and each of said distinct decimal numbers corresponds to a playing position (1 to 8) mapping two edges of the geometric playing field of the block diagram described in FIG. 1 such that the first set of random numbers corresponds to the eight playing positions at the left and bottom edges of the playing field, the second set of random numbers corresponds to the eight playing positions at the top and right edges of the playing field. The central processing unit 30 also assigns eight predefined binary numbers 000, 001, 010, 011, 100, 101, 110 & 111, which are stored in ROM 62, to the eight playing positions at the left and bottom edges of the playing field such that the binary number 000 is assigned to the location identified by the first decimal number of the first random set, the binary number 001 is assigned to the location identified by the second decimal number of the first random set, etc. Similarly, the eight predefined binary numbers 000, 001, 010, 011, 100, 101, 110 and 111, which are stored in ROM 62, are assigned to the eight playing positions at the top and right edges of the playing field.

It should be noted that additional code assignment configurations could be selected based on the current and desired payout levels.

Figure 2:
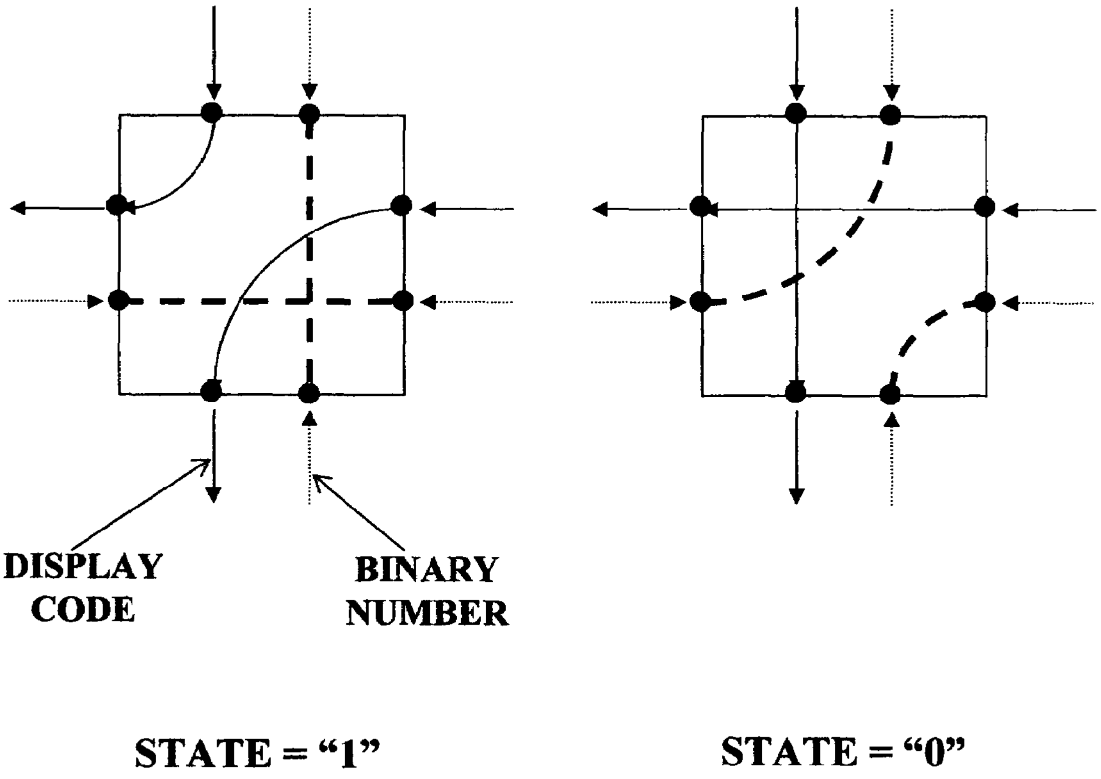
FIG. 2 depicts a geometric representation of a logical element referred to as the routing square, indicating two routes for routing binary codes to each other, and two optional routes for the dynamic assignment of display codes to playing positions, for each of its two states.

After the initial assignment of binary numbers to the playing positions located at the perimeter of the playing field, and using the connectivity provided by the routing elements described in FIG. 2, the binary numbers or codes are distributed to the remaining playing positions. As a result, linked to each playing position are four code elements projected to the top, left, bottom and right edges of the routing square associated with the playing position. These four code elements are then selected and routed to each other when the switch associated with the playing position is activated. Accordingly, the routing of binary codes to each other is respective to the location of the activated switch. It should be noted, and as would be obvious to a person of ordinary skills in the art, it is not necessary to use an external switch for the activation of a routing square. The control logic can directly activate the routing element associated with a playing position. Obviously in such case, the player will not be able to interact with the gaming machine.

Figure 17:
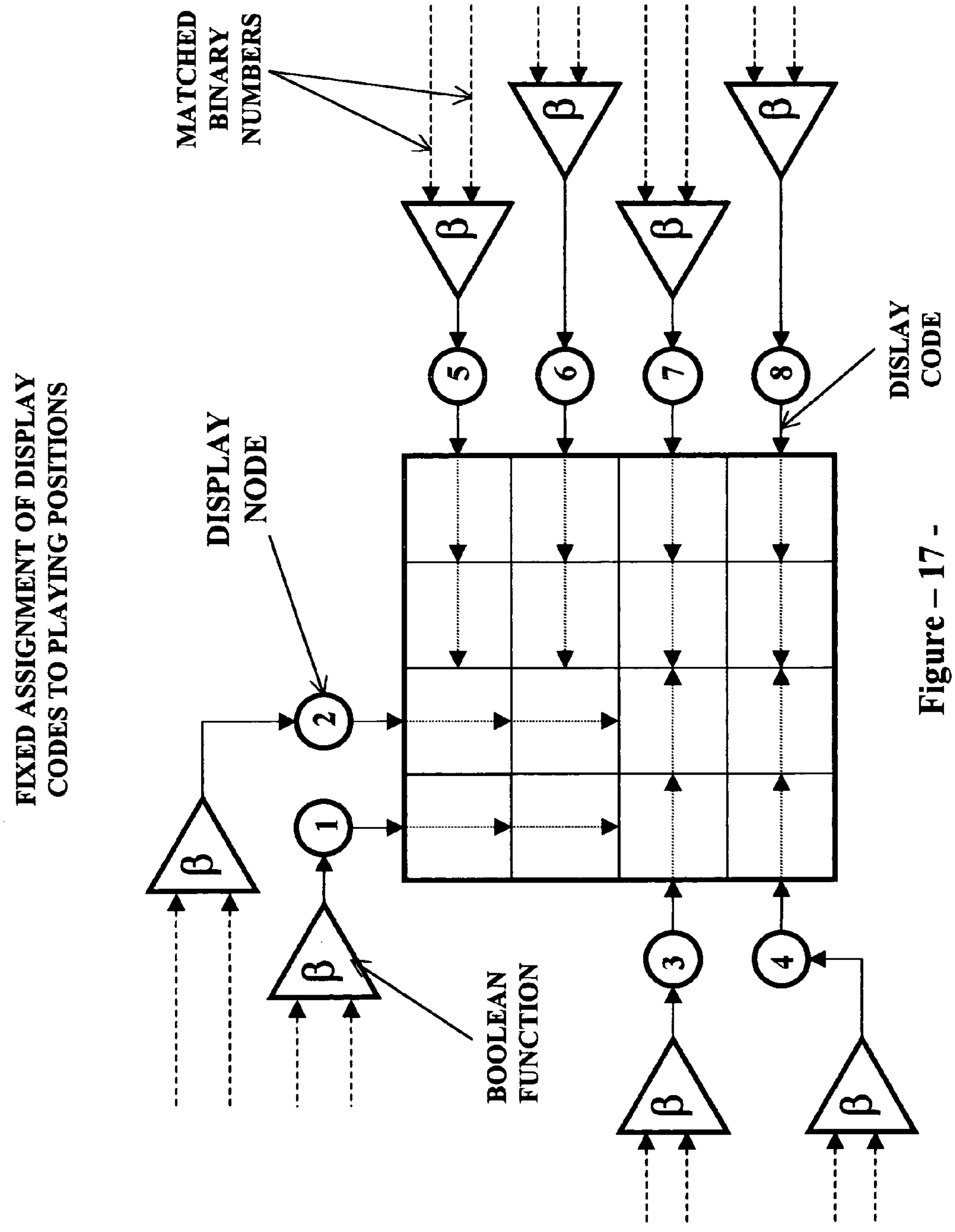
FIG. 17 is layout showing a fixed assignment of display codes to playing positions.

With respect to selecting an appropriate display parameter that corresponds to a desired payout level, there are many options to select from for the assignment of display codes to playing positions. For the preferred embodiment, there are the eight display codes, which are assigned by the microprocessor to the sixteen playing positions in order to activate the indicators. The specific assignment of display codes to playing positions will affect the occurrence of a wining combination of a specific color or colors. However, the winning combination defined by the condition when all playing locations are indicating the same color is not affected as long as all eight display codes are used. This is obvious to a person of ordinary skills in the art by virtue of the fact that when such winning combination is reached, all eight display-codes are identical, and it does not matter how they are assigned to the playing positions. Since there are eight display codes and sixteen playing positions for the preferred embodiment, it follows that there are over 86,355, 926,616 possible fixed assignments. Each fixed assignment is a simple association between a display code and one or more pre-defined playing positions. For example, one possible fixed assignment is to associate the first display code with playing positions 1 & 5, the second display code with playing positions 2 & 6, the third display code with playing positions 9 & 10, and so on, as indicated in FIG. 17.

Because there are literally unlimited design choices on how to assign display codes to playing position, it follows that the main factor affecting the selection of a particular assignment is the relationship between the desired payout rate, and the actual payout rate. However, once an assignment is selected based on said payout relationship, it remains the same during the course of a game. A game is defined by a series of random activations of the switches associated with the playing positions, followed by one or a plurality of manual activations by the player.

Figure 16:
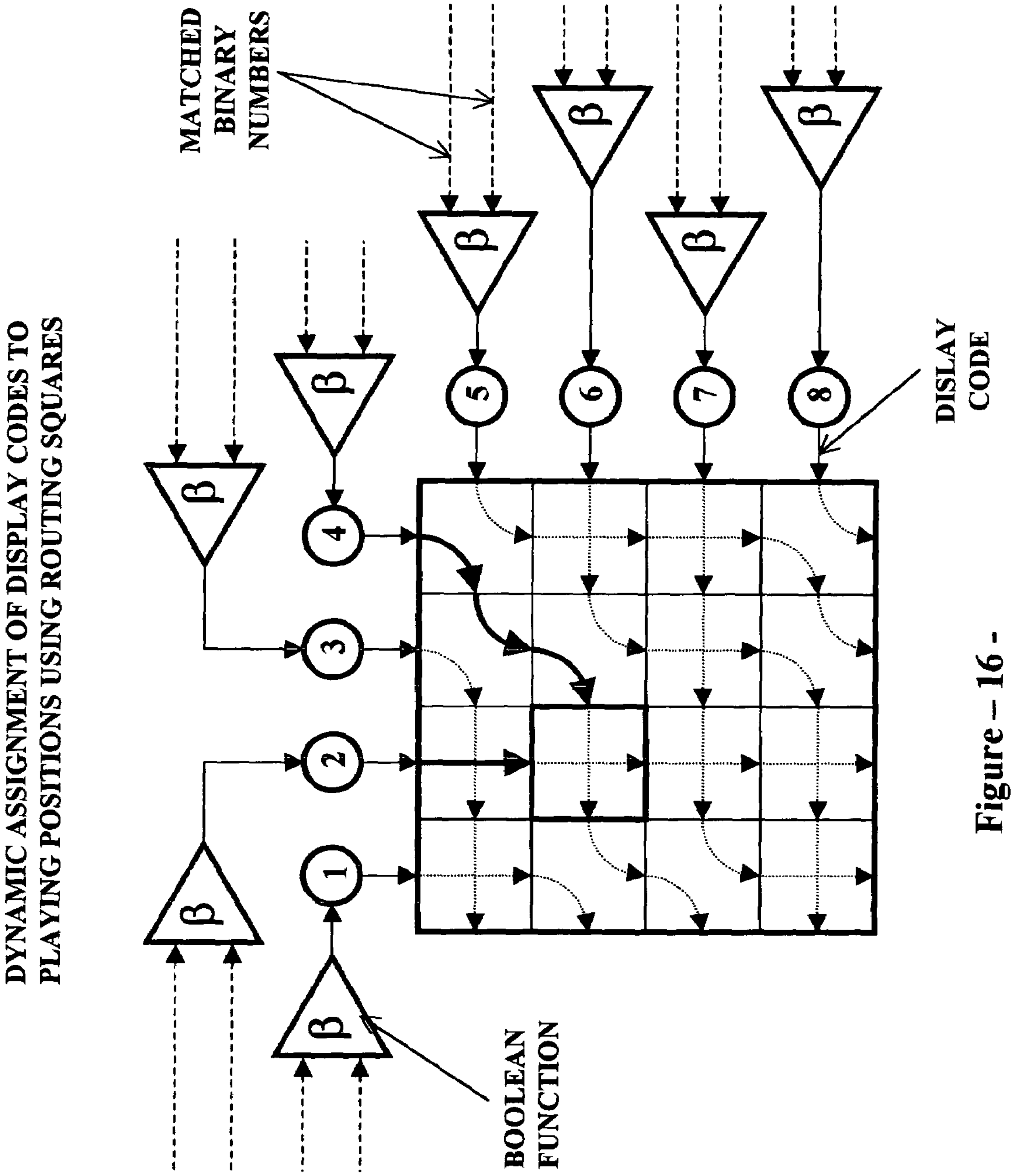
FIG. 16 is layout showing a dynamic assignment of display codes to playing positions, using routing squares.
Figure 18:
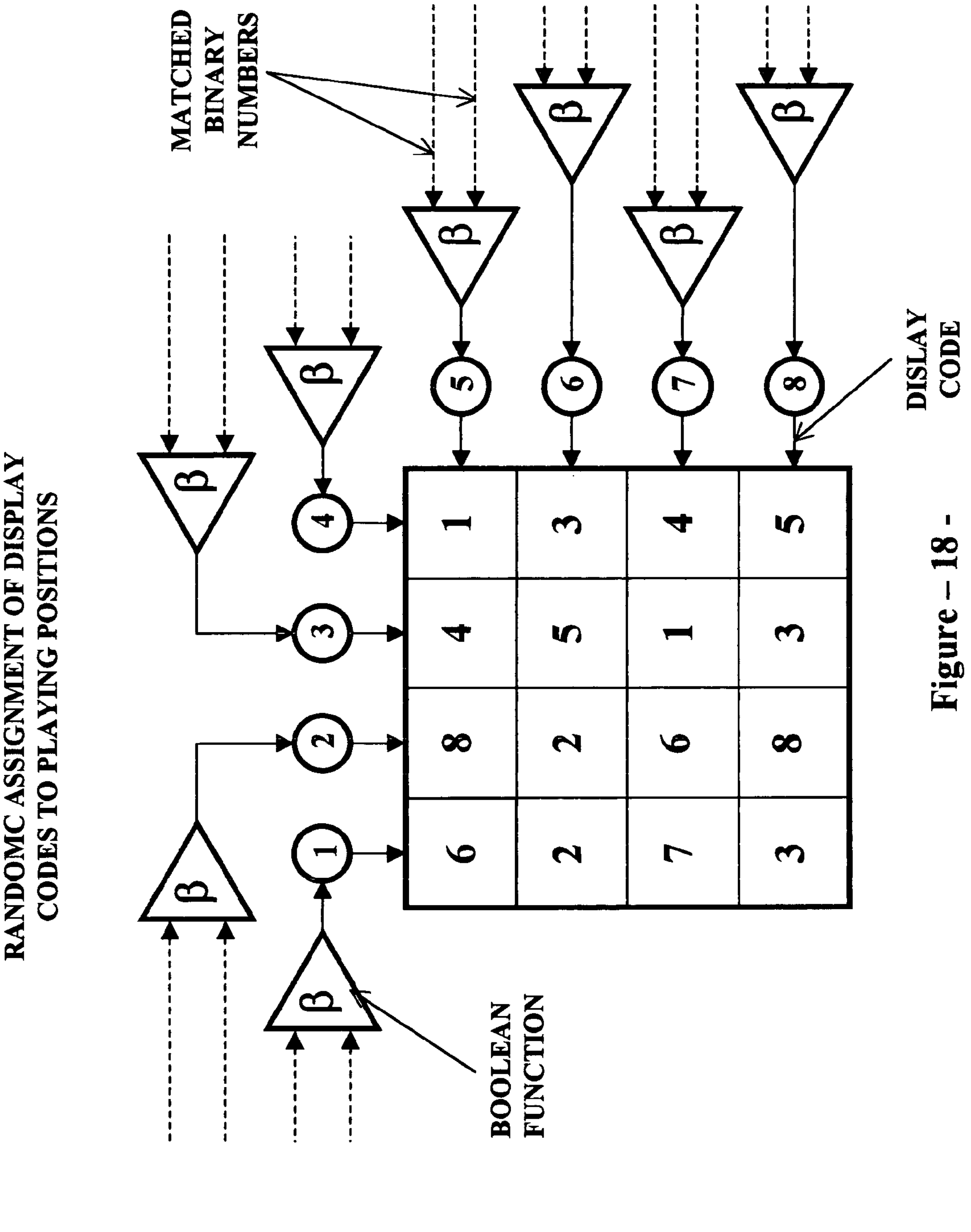
FIG. 18 is layout showing a random assignment of display codes to playing positions.

As would be obvious to a person of ordinary skills in the art, other design choices may be employed. For example, it is possible to use a different fixed display assignment for each switch's activation during a game. It is also possible to employ a dynamic and variable assignment of display codes to playing positions. Such dynamic and variable assignment is based on the use of the routing squares to assign display codes to playing positions as indicated in FIG. 16. Since the routing square described in FIG. 2 has two states, and each state has a different connectivity pattern, it follows that the dynamic and variable assignment is dependent on the states of the routing squares or the playing positions. Further, since each routing square has two binary codes associated with it, there are a number of options to select one of the two binary codes to be displayed at each playing position. Such selection could be fixed, which means that one of the two binary codes is always selected. The selection could be random, or the selection could be based on the state of each routing square or playing position. For the purpose of describing the preferred embodiment, a dynamic and variable assignment that utilizes the state of each routing square to select one of the two color codes present at each playing position is disclosed and provided by the following description. Furthermore, a designer may elect to randomly assign display codes to playing positions as indicated in FIG. 18. It should be noted that, when either a fixed or a random assignment is employed, a display code can be assigned to one or a plurality of playing positions. Further, not every display code may be assigned to display positions. The selection as to which display codes will be assigned, and which will not be assigned could be made at random. A feature to randomly exclude certain display codes from being assigned to playing positions will impact the probability of occurrence of winning combinations of colors or images corresponding to said display codes.

For the purpose of the description of the preferred embodiment, the display codes are represented by nodes located at the top and right edges of the playfield as indicated in FIGS. 1, 16, 17 & 18. Obviously, such nodes could be located at any playing position in the playfield. If dynamic assignment is selected, the central processing unit 30, through its control logic program, identifies the locations of the indicators connected to each node and assigns the display code associated with that node to either the top edge or the right edge of the routing square associated with each playing position that is connected to the node. The control logic first determines if the node is located at either the top edge or the right edge of the playing field, then it determines the location of the fist playing position and indicator adjacent to said node. If the node is located at the top edge of the playing field, the central processing unit 30, through its control logic program, assigns the display code to the top edge of the routing square associated with the first playing position. Alternatively, if the node is located at the right edge of the playing field, the central processing unit 30, through its control logic program, assigns the display code generated to the right edge of the routing square associated with the first playing position. Starting at said first playing position, the control logic program traces an internal route within the playing field by using the status of the routing square associated with the first playing position to determine the location of the second playing position on the route. The status of the routing square associated with the second playing position is then used to determine the location of the third playing position on the route, etc. The foregoing process continues until this internal route terminates at either the left edge or the bottom edge of the playing field. While this is occurring, the central processing unit 30 also assigns the display code to either the top edge or the right edge of the routing square associated with playing position on the route. The central processing unit 30, under the instruction of the control logic program, then causes the display codes assigned to either the top edge or the right edge of the routing square associated with each playing position on the route to be stored in RAM 64. The foregoing operation is employed to identify all display routes within the playfield and to assign two display codes to each playing position.

To complete the assignment of display codes to playing positions, the central processing unit 30, under the direction of the control logic program, selects one of the two display codes assigned to the playing position. Such selection can be based on the status of the routing square associated with the playing position, or can be made at random. For the purpose of the preferred embodiment, random selection is employed.

Another option that may be employed following the assignment of display codes to playing positions is to randomly redistribute these display codes to the playing positions. If such option is selected, then the central processing unit 30 generates a set of random numbers which comprises sixteen (16) distinct decimal numbers from 1 to 16, where each of these decimal numbers corresponds to each of the actual positions of the indicators 16-1 through 16-16, such that if the control program determines that the indicator at position 16-*z* should be activated, the central processing unit 30 will activate the indicator at position 16-*w*, wherein w is the random decimal number which corresponds to actual display position z.

It should be noted that the aforestated description of display options, and algorithms to change the payout level is disclosed for the purpose of describing the preferred embodiment, and an optional feature, and is not intended to limit the invention herein. As will be understood by those skilled in the art, many other algorithms or methods could be used to increase or decrease the payout level.

The preferred embodiment employs momentary switches to enable a player to interact with the gaming device. Because the routing elements employed by the preferred embodiment are bi-stable devices, they can be used to keep track of momentary switch activations. As indicated in FIG. 2, the routing square is a bi-stable device that, upon successive activations of the associated switch, will alternate between two states. Therefore, each activation of a momentary switch will cause the associated routing element to change state. Upon turning the ON-OFF switch to the "ON" position, all routing squares will be in the same state, and games will be defined solely by the assignment and distribution of operating codes to playing positions. However, it should be obvious to those skilled in the art that initial states of the routing squares could be set randomly after each lever's activation by the player. It should, also, be noted that the description of the routing square shown in FIG. 2 is disclosed for the purpose of describing the preferred embodiment. Different logical or routing elements may be utilized to perform the function of selecting and matching pairs of binary codes respective to playing positions. Such logical elements may have different connectivity patterns and/or a larger number of states than the two disclosed in FIG. 2. Also, a fixed pattern could be used to associate the control switch of a playing position with a plurality of indicators.

If bi-stable interactive play switches are used, and in order to determine the initial status of all switches 22-1 through 22-16, the central processing unit 30 accesses each of said switches over the address and control bus 92 and interface and coding device 38 causing a signal to be transmitted thereto via the data bus 90. The central processing unit 30 identifies the status of the switch, i.e., if the switch is in the "ON" ("1") or "OFF" ("0") position. The central processing unit 30, through its control program, identifies the RAM memory address, which corresponds to the switch and accesses this memory address over the address control bus 92. The central processing unit 30 then transfers the data on the status of the switch to said RAM memory address over the data bus 90.

After the selection of code assignment, and display parameters, the control logic will cause the gaming machine to generate game introduction with sound effects, and will query the player to pick specific color or colors, and to select interactive manual play if desired. The player is then required to deposit an appropriate number of coins based on the number of colors selected, and the number of interactive manual plays desired. Upon the deposit of required coins by the player, the control program will activate color indications to visually confirm to the player that a particular color or colors was, or were selected. The player can deselect a color, prior to the activation of the lever, by actuating the switch corresponding to said color. The control program will also confirm to the player that manual interactive play was selected by activating a proper visual indication. It should be noted that at any time after the deposit of a coin, the player could activate the lever 28, and initiate game play. However, the game will be based only on the selected colors and interactive manual play that were confirmed before the activation of the lever 28.

Upon the activation of the lever 28 by the player, the central processing unit 30 through its control logic program, generates a random number, k, where k is an integer representing the number of iterations in a game before a final display is presented to the player. The control logic program, also, generates a sixteen bit binary number to establish initial positions for the routing squares. In addition, the control program establishes an initial time delay to control the timing between two consecutive displays during the course of a game. The control logic then performs the task of matching pairs of binary numbers respective to each playing position for the purpose of generating an initial set of display codes to activate the displays based on the selected display parameters. For the preferred embodiment, the selection and routing of pairs of binary numbers to each other is performed by a control logic that implements the routing square described in FIG. 2. It should be noted that other routing elements could be used to select and route binary codes to each other. For example, one set of binary numbers can be assigned to playing positions, the second set could represent a fixed, or random relationship between playing positions.

To generate display codes from pairs of binary codes, the control logic executes the "EXCLUSIVE NOR" Boolean function on the third (left) digit of each the matched pairs of binary codes to compute the third (left) digit of said display codes. Further, the first and second digits of the display codes are computed from the first and second digits of the binary codes using the "EXCLUSIVE OR" Boolean function. It should be noted that the use of Boolean functions to generate display codes from binary codes is disclosed for the purpose of describing the preferred embodiment, and is not intended to limit the invention herein. As would be obvious to a person of ordinary skills in the art, lookup tables could be used to generate display codes from binary codes. Examples of lookup tables for various configurations are provided in FIGS. 19, 20, 21, 22, 23, 24, 25, 26 & 28. Also, the specific Boolean function employed for a particular embodiment is dependent on a number of factors, including the number of playing positions, the number of desired colors, the length of the binary numbers or codes, etc. Further, it is possible to employ a different Boolean function for the same embodiment by simply varying the display code assignments.

In order to activate an indicator at a playing position, the central processing unit 30, through its control program, identifies the display code assigned to said playing position, and fetch it from the corresponding address in RAM 64. Then the microprocessor transfers or routes said display code to the corresponding memory decoder driver 56. The memory decoder driver 56, in turn, decodes the received display code and activates the indicator such that if the display code equals to "100", then the indicator will display "RED;" if the display code equals to "101", then the indicator will display "YELLOW;" if the display code equals to "110", then the indicator will display "GREEN;" if the display code equals to "111", then the indicator will display "BLUE;" if the display code equals to "000", then the indicator will display "AQUA;" if the display code equals to "001", then the indicator will display "ORANGE;" and if the display code is either "010" or "011", then the indicator will be "DARK."

It should be noted, and as would be obvious to those skilled in the art, the assignment of colors to display codes is arbitrary. That is any of the seven identified colors could be assigned to any of the listed display codes. For example, "DARK" could be assigned to the subset of display codes defined by a first (left) digit equal to "1" and a second and third digits equal to "00." Similarly, "RED" could be assigned to the subset of display codes having a first (left) digit equal to "0". Further, and as would be obvious to those skilled in the art, the assignment of display codes to colors could be manipulated to vary the number of colors playable by the gaming machine. For example, the definition of "DARK" could be expanded to include the display code subsets of "000", "001", "101", "110" and "111". In such a case, the device will operate with two colors, "RED" and "BLACK". Similarly, if it is desired to provide a three color gaming machine, one possible color scheme would assign the display code subsets "100" & "101" to "RED," the display code subsets "110" & "111" to "GREEN," and the display code subset defined by the first (left) digit equal to "0" to "BLACK." Accordingly, for a 4×4 playing field, it is possible to operate with 2, 3, 4, 5, 6, 7 or 8 colors. For the purpose of describing the preferred embodiment, and as a best mode of operation, the preferred embodiment describes the operation with seven colors.

Figure 28:
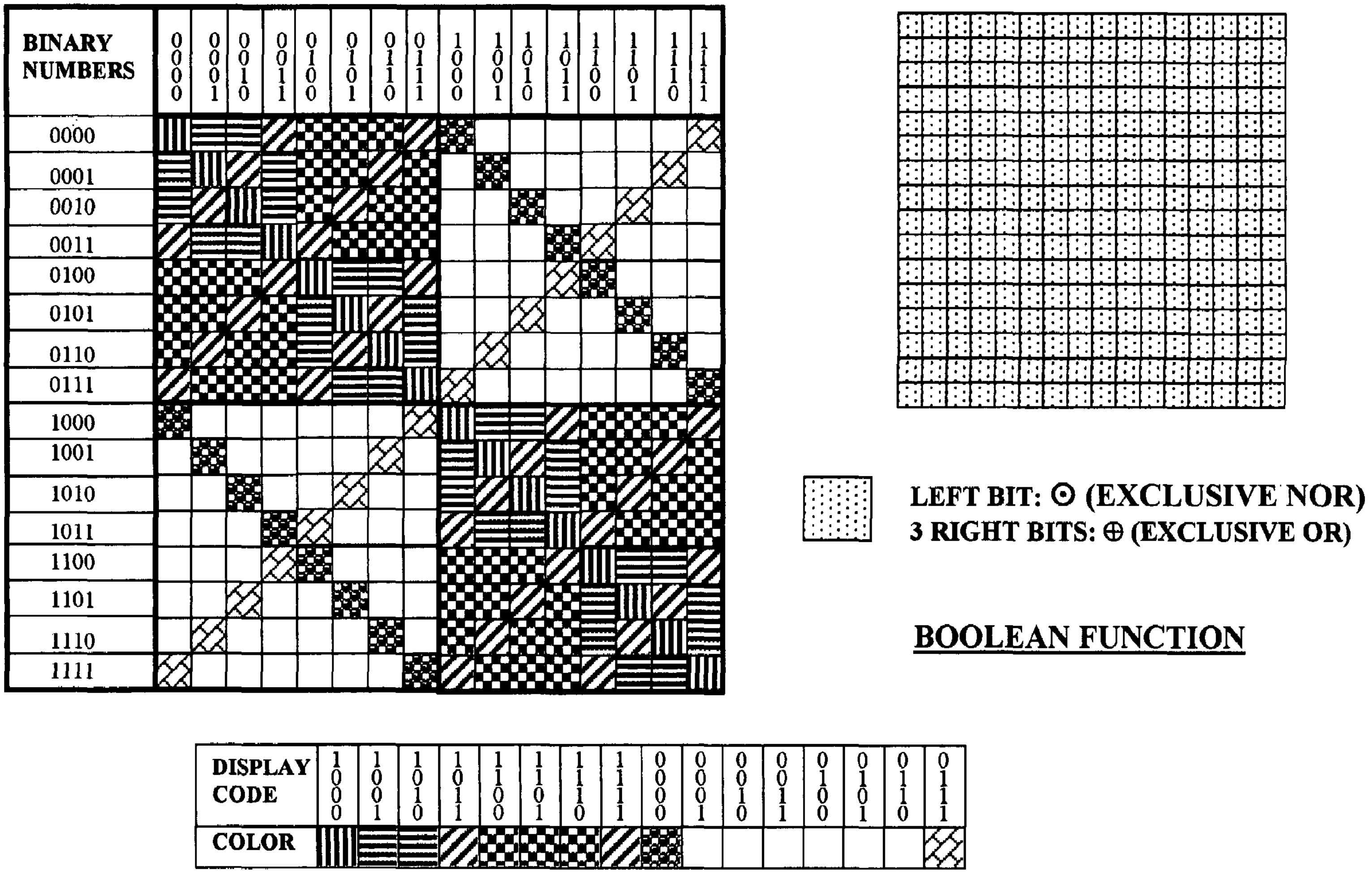
FIG. 28 is a lookup table of display code assignments for an 8×8 playing positions, demonstrating how display code assignment is used to vary the probability of occurrence of a winning combination of a color or an image.

The above disclosed technique for assigning display codes to specific colors can be used to provide different probability of occurrence for winning combinations of different colors. For example, if two primary display codes are assigned to green, and a single primary display code is assigned to red, then the probability of occurrence of a winning combination of the green color is higher than the probability of occurrence of the same winning combination for the red color. An example of a configuration that employs multiple display code assignment is shown in FIG. 28.

It should also be noted that the use of memory decoder drivers 56 to decode the display codes and activate the indicators is only for the purpose of describing the preferred embodiment. As would be obvious to a person of ordinary skills in the art, the decoding of the display codes can be performed in software by the program logic. In such a case, the control program activates output ports of a microcontroller to control the indicators connected to said output ports. Similarly, LCD and other drivers could be integrated in the microprocessor.

Next, the control logic will execute the first of R iterations by generating a random number, K, from 1 to 16, where K represents a location for a playing position The control logic will then toggle the routing square at location K, and will route the binary numbers to each other based on the new status of the routing square at playing position K in order to generate a new set of display codes. The microprocessor will then update the displays based on the newly generated display codes. The time delay will then be incremented, and the microprocessor will repeat this process for the second through the $R^{th}$ iteration. The reason the time delay is incremented between iterations is to have the visual effect of slowing down the dynamic display provided by the successive iterations. In order to dramatize the effect of the dynamic display, a wheel of multi-colored circular lights 23 surrounding the playing positions is added to the display, and is updated in every iteration by shifting the colors of the circular lights by one position, clockwise, in each iteration. This will produce the visual effect of a slowing rotating wheel. The display employed in the preferred embodiment is indicated in FIG. 4.

Upon the completion of the $R^{th}$ iteration, the control program will determine if a winning combination has occurred for any of the selected colors. If a win has occurred, the microprocessor calculates the number of coins won by the player, and will display such number on win meter display 15. Also, the microprocessor will generate an appropriate visual and audible effect based on the number of coins won by the player. The control program will then initiate the process of dispensing the coins won by the player.

Next, if the player had selected the optional interactive manual play, the microprocessor will instruct the player to activate any of the sixteen switches associated with the playing positions. Upon the activation of a switch by the player, the microprocessor, through its control logic program, first identifies the location of the activated switch, then it toggles the routing square at that playing position. The binary codes will then be routed to each other in order to calculate new display codes and update the displays. A determination is then made if a winning combination has occurred. If a winning combination exists, the microprocessor will generate the appropriate audible and visual effects, and will dispense the winning coins. The above described process for interactive manual play will be repeated until the player exhausts the pre-selected number of interactive manual plays.

Upon the completion of a game, the control logics calculates the actual payout rate, taking into account the number of coins deposited by the player, as well as any coins won during the game. Next, the control logic compares the actual payout rate with the desired payout rate setting. If the actual payout rate is greater than the desired payout rate, and if the difference between the two payout rates is larger than a predefined threshold, then the control program will select new code assignment and display parameters that would decrease the odds of winning. Conversely, if the actual payout rate is less than the desired payout rate, and if the difference between the two payout rates is larger than a predefined threshold, then the control program will select new code assignment and display parameters that would increase the odds of winning. Alternatively, if the difference between the two payout-rates is less than the predefined threshold, then the current code assignment and display parameters are not modified. Following the process to adjust the actual payout rate, the player is instructed to commence a new game if desired, and the entire process is repeated.

In the event a "JACKPOT" feature is implemented in this gaming device, and during game play, the control logic will generate a sixteen bit random number, wherein each bit corresponds to a playing position. Next, the control program compares each of the bits for the generated random number with the state of the corresponding routing square after the completion of the $R^{th}$ iteration. If equal, then the indicator at that playing position will display a "LUCK 7." To win the "JACKPOT", a "LUCKY7" must be displayed at each playing position. If interactive manual play is selected, the control program generates a new sixteen bit binary number for each manual activation of a playing position.

It should be noted that the above described gaming device can be implemented as a stand alone slot machine, having its own housing, or as an internet gaming device consisting of an appropriate software running on a host computer. In a stand alone implementation, and similar to other slot machines, the housing will include a door, door position sensing means, means for detecting a tilt condition and means for detecting when the gaming device is out of order. Further, the machine will include a structure for accepting coins, means for determining the validity of a received coin, means for generating a reject signal, means to process coin information, and means for transmitting said information to an information display panel.

Also, the processing of coin information will consist of a structure for storing data representing the number of coins in the coin storage device, a structure for incrementing said data in response to each coin accepted for storage by the coin accepting mechanism, and means for decrementing said data in response to each coin paid out from the storage device. In addition, the machine will implement a mechanism to reject a coin under certain conditions. A coin reject signal will be generated under a number of conditions, including when the received coin is not valid, the game play has been initiated by a player and the game play has not been completed, a coin has been accepted for game play and the game has not been completed, a game is in progress, the gaming device is locked up in a win condition, the gaming device is in a tilt condition, the gaming device has an open door condition, or the gaming device is out of order. Obviously, the gaming device may also include a mechanism for accepting paper currency.

Further, the current invention could be implemented as a primary gaming device, or as a bonus game in a traditional reel machine. If the current invention is implemented as a primary gaming device, then upon the occurrence of a winning combination of a symbol representing a bonus game, such bonus game is activated. For example, if the bonus game is a "Wheel of Fortune" type game, then when the symbol representing the "Wheel of Fortune" is displayed at all locations on a winning line, then the "Wheel of Fortune" game is activated. Any known bonus game could be implemented with the current invention.

Alternatively, when the invention is used as a bonus game in a traditional reel machine, and upon the occurrence of a winning combination of a rainbow symbol representing the multi-color gaming device, the game disclosed in the current invention is initiated.

As will be understood by those skilled in the art, many different programs may be utilized to implement the flow charts disclosed in FIG. 7 through FIG. 14. Obviously these programs will vary from one another in some degree. However, it is well within the skill of the computer programmer to provide particular programs for implementing each of the steps of the flow charts disclosed herein. It is also to be understood that the foregoing detailed description has been given for clearness of understanding only and is intended to be exemplary of the invention while not limiting the invention to the exact embodiment shown. Obviously certain modifications, variations and improvements will occur to those skilled in the art upon reading the foregoing. It is, therefore, to be understood that all such modifications, variations and improvements have been deleted herein for the sake of conciseness and readability, but are properly within the scope and spirit of the following claims.

What is claimed and desired to be secured by letters of patent is:

1. A slot machine comprising:

a playfield that includes a plurality of playing positions, wherein each playing position includes an indicator that provides a plurality of visual indications, and wherein at least one combination of visual indications at a plurality of playing positions is defined as a winning combination, at least one of a lever, and a switch to activate the slot machine, means for assigning a first set of binary numbers to playing positions, a plurality of logical elements that are responsive to control means, and wherein a logical element routes at least two binary numbers to each other, a control mechanism that, upon the activation of said lever or switch, sequentially selects and activates a plurality of said logical elements, means for generating a second set of binary numbers from said first set of binary numbers for each activation of a logical element in the sequence, means for assigning said second set of binary numbers to indicators on the playfield to provide visual indications associated with each activation of a logical element in the sequence, and means for determining if a winning combination of visual indications has occurred after the activation of the last logical element in the sequence.

2. A slot machine as recited in claim 1 further comprising a housing.

3. A slot machine as recited in claim 1 wherein at least one of the number of activated logical elements in the sequence, and the locations of the activated logical elements in said sequence, are determined at random.

4. A slot machine as recited in claim 1 further comprising a switch associated with each logical element.

5. A slot machine as recited in claim 1 wherein said means for assigning a first set of binary numbers to playing positions is based on an algorithm that employs a random number generator.

6. A slot machine as recited in claim 1 wherein said means to generate a second set of binary numbers from said first set of binary numbers includes at least one of a Boolean function, and a lookup table.

7. A slot machine as recited in claim 1 further comprising means for varying the probability of occurrence of a winning combination of visual indications.

8. A slot machine as recited in claim 7 wherein said means for varying the probability of occurrence of a winning combination includes means for controlling the assignment of the first set of binary numbers to playing positions.

9. A slot machine as recited in claim 7 wherein said means for varying the probability of occurrence of a winning combination includes means for varying the assignment of the second set of binary numbers to indicators.

10. A slot machine as recited in claim 1 further comprising means for the player to bet on the occurrence of winning combinations related to one specific visual indication.

11. A slot machine as recited in claim 1 further comprising means to afford the player at least one chance to manually activate a logical element after the activation of the last logical element in the sequence.

12. A slot machine as recited in claim 1 further comprising means for controlling the payout rate of the machine.

13. A slot machine as recited in claim 1 further comprising means to provide a progressively increasing jackpot prize.

14. A slot machine as recited in claim 2 further comprising means for accepting a wager.

15. A slot machine as recited in claim 1, wherein said binary numbers that are routed to each other are assigned to the playing positions at the top, bottom, left, and right of the activated logical element.

16. A slot machine as recited in claim 1, wherein said logical element includes a geometric configuration that comprises a plurality of internal routes to route binary numbers to each other, and wherein the geometric configuration has two states such that the first state is associated with at least one route, and the second state is associated with at least one alternate route.

17. A slot machine as recited in claim 1 further comprising a bonus game.

18. A slot machine as recited in claim 17, wherein said bonus game includes a rotating wheel that is randomly stopped to reveal a winning prize.

19. A slot machine comprising:

a playfield that includes a plurality of playing positions, wherein each playing position includes an indicator that provides a plurality of visual indications, and wherein at least one combination of visual indications at a plurality of playing positions is defined as a winning combination, at least one of a lever, and a switch to enable a player to activate the slot machine, a microprocessor with a computer-readable medium encoded with a computer program to control the operation of the slot machine, a computer program segment that assigns a first set of binary numbers to playing positions, a computer program segment that simulates a plurality of logical elements, wherein a logical element routes at least two binary numbers to each other, a computer program segment that, upon the activation of said lever or switch, sequentially selects and activates a plurality of logical elements, a computer program segment that generates a second set of binary numbers from said first set of binary numbers, for each activation of a logical element in the sequence, using at least one of a Boolean function, and a lookup table, a computer program segment that assigns said second set of binary numbers to indicators on the playfield to provide visual indications associated with each activation of a logical element in the sequence, and a computer program segment that determines if a winning combination of visual indications has occurred after the activation of the last logical element in the sequence.

20. A slot machine as recited in claim 19 further comprising a housing.

21. A slot machine as recited in claim 19 further comprising a keypad switch associated with each logical element.

22. A slot machine as recited in claim 19, wherein at least one of the number of activated logical elements in the sequence, and the locations of the activated logical elements in said sequence, are determined at random.

23. A slot machine as recited in claim 19 further comprising a computer program segment for varying the probability of occurrence of a winning combination of visual indications.

24. A slot machine as recited in claim 23 wherein said computer program segment for varying the probability of occurrence of a winning combination includes an algorithm for controlling the assignment of the first set of binary numbers to playing positions.

25. A slot machine as recited in claim 23 wherein said computer program segment for varying the probability of occurrence of a winning combination includes an algorithm that vary the assignment of the second set of binary numbers to indicators.

26. A slot machine as recited in claim 19 further comprising a computer program segment, and a plurality of switches to enable a player to bet on the occurrence of winning combinations related to a specific visual indication.

27. A slot machine as recited in claim 21 further comprising a computer program segment, and a plurality of switches to afford the player at least one chance to manually activate a logical element after the activation of the last logical element in the sequence.

28. A slot machine as recited in claim 19 further comprising a computer program segment that controls the payout rate of the machine.

29. A slot machine as recited in claim 19 further comprising a computer program segment to provide a progressively increasing jackpot prize.

30. A slot machine as recited in claim 19 further comprising a bonus game.

31. A slot machine as recited in claim 30, wherein said bonus game includes a rotating wheel that is randomly stopped to reveal a winning prize.

32. A slot machine comprising:

a housing, a microprocessor with a computer-readable medium encoded with a computer program to control the operation of the slot machine, a computer program segment that assigns binary numbers to a plurality of playing positions, each of which includes an indicator, a computer program segment that simulates a plurality of logical elements at playing positions, wherein a logical element routes at least two binary numbers to each other, a computer program segment that sequentially selects and activates a plurality of logical elements, wherein at least one of the number of activated logical elements in the sequence, and the locations of the activated logical elements in said sequence, are determined at random, a computer program segment that generates a second set of binary numbers from said first set of binary numbers, for each activation of a logical element in the sequence, using at least one of a Boolean function, and a lookup table, a computer program segment that assigns said second set of binary numbers to indicators at playing positions to provide visual indications associated with each activation of a logical element in the sequence, and a computer program segment to determine if a winning combination of visual indications has occurred after the activation of the last logical element in the sequence.

33. A slot machine as recited in claim 32 wherein the indicators are implemented using at least one of a video monitor, an LED screen, and an LCD screen.

34. A slot machine as recited in claim 32 further comprising a bonus game.

35. A slot machine as recited in claim 32 further comprising a computer program segment to provide a progressively increasing jackpot prize.

36. A slot machine as recited in claim 32 further comprising a computer program segment, and a plurality of switches to enable the player to bet on the occurrence of winning combinations related to one specific visual indication.

37. A slot machine that includes a housing, a microprocessor with a computer-readable medium encoded with a computer program to control the operation of the slot machine, and a bonus game that operate on the slot machine, comprising:

a computer program segment that triggers the bonus game, a computer program segment that assigns binary numbers to a plurality of playing positions, each of which includes an indicator, a computer program segment that simulates a plurality of logical elements at playing positions, wherein a logical element routes at least two binary numbers to each other, a computer program segment that sequentially selects and activates a plurality of logical elements, wherein at least one of the number of activated logical elements in the sequence, and the locations of the activated logical elements in said sequence, are determined at random, a computer program segment that generates a second set of binary numbers from said first set of binary numbers, for each activation of a logical element in the sequence, using at least one of a Boolean function, and a lookup table, a computer program segment that assigns said second set of binary numbers to indicators at playing positions to provide visual indications associated with each activation of a logical element in the sequence, and a computer program segment to determine if a winning combination of visual indications has occurred after the activation of the last logical element in the sequence.

38. A method for generating a sequence of visual indications in a slot machine that includes a plurality of playing positions, and a plurality of logical elements, wherein each playing position includes an indicator that provides a plurality of visual indications, and wherein at least one combination of visual indications at a plurality of playing positions is defined as a winning combination, comprising the steps of:

assigning a first set of binary numbers to playing positions, sequentially, activating a plurality of logical elements to route binary numbers to each other during each activation, generating a second set of binary numbers from said routed binary numbers for each activation, assigning said second set of binary numbers to indicators to produce visual indications for each activation, and determining if a wining display combination has occurred after the last activation.

* * * * *